US012750717B2

(12) United States Patent
Tao et al.

(10) Patent No.: US 12,750,717 B2
(45) Date of Patent: Sep. 29, 2026

(54) SYNCHRONIZATION SIGNAL MEASUREMENT IN A NON-TERRESTRIAL NETWORK

(71) Applicant: Google LLC, Mountain View, CA (US)

(72) Inventors: Ming-Hung Tao, Taoyuan City (TW); Chih-Hsiang Wu, Taoyuan City (TW)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 18/725,320

(22) PCT Filed: Jan. 7, 2023

(86) PCT No.: PCT/US2023/010365
§ 371 (c)(1),
(2) Date: Jul. 9, 2024

(87) PCT Pub. No.: WO2023/133302
PCT Pub. Date: Jul. 13, 2023

(65) Prior Publication Data

US 2025/0106798 A1 Mar. 27, 2025

Related U.S. Application Data

(60) Provisional application No. 63/297,683, filed on Jan. 7, 2022.

(51) Int. Cl.
*H04B 7/185* (2006.01)
*H04B 17/20* (2015.01)
(Continued)

(52) U.S. Cl.
CPC ........ *H04W 24/10* (2013.01); *H04B 7/18523* (2013.01); *H04B 7/18541* (2013.01);
(Continued)

(58) Field of Classification Search
CPC ............. H04B 7/02–216; H04B 17/0082–409; H04W 24/02–10; H04W 36/0005–385;
(Continued)

(56) References Cited

U.S. PATENT DOCUMENTS 10,673,515 B2 6/2020 Lee et al.
11,041,959 B2 6/2021 Lucky et al.
(Continued)

FOREIGN PATENT DOCUMENTS

WO 2017142584 A1 8/2017
WO 2020145559 A1 7/2020
(Continued)

OTHER PUBLICATIONS

CATT, "Report of [POST112-E] [106] [NTN] SMTC and Gaps (CATT)", 3GPP TSG-RAN WG2 Meeting #112E, R2-2010768, Electronic: Nov. 2-13, 2020.
(Continued)

*Primary Examiner* — Timothy J Weidner
(74) *Attorney, Agent, or Firm* — PATENT PORTFOLIO BUILDERS PLLC

(57) ABSTRACT

A UE receives, from a non-terrestrial network (NTN), a measurement configuration that indicates (i) a timing pattern according to which a signal source associated with the NTN transmits a synchronization signal and (ii) a timing parameter related to a change in timing alignment between the UE and the signal source. The UE receives, from the signal source, the synchronization signal in accordance with the timing pattern and the timing parameter.

20 Claims, 13 Drawing Sheets

(51) Int. Cl.

| | |
|---|---|
| ***H04B 17/382*** | (2015.01) |
| ***H04W 24/08*** | (2009.01) |
| ***H04W 24/10*** | (2009.01) |
| ***H04W 36/00*** | (2009.01) |
| ***H04W 56/00*** | (2009.01) |
| ***H04W 84/06*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |
| ***H04W 92/20*** | (2009.01) |

(52) U.S. Cl.
CPC ......... *H04B 17/254* (2023.05); *H04B 17/382* (2015.01); *H04W 24/08* (2013.01); *H04W 36/0058* (2018.08); *H04W 36/0061* (2013.01); *H04W 56/003* (2013.01); *H04W 56/005* (2013.01); *H04W 84/06* (2013.01); *H04W 88/02* (2013.01); *H04W 88/08* (2013.01); *H04W 92/02* (2013.01); *H04W 92/10* (2013.01); *H04W 92/20* (2013.01)

(58) Field of Classification Search
CPC ....... H04W 56/0005–0095; H04W 84/005–22; H04W 88/005–188; H04W 92/02–24
See application file for complete search history.

(56) References Cited

U.S. PATENT DOCUMENTS

| | | | |
|---|---|---|---|
| 2021/0136641 | A1 | 5/2021 | Roy et al. |
| 2021/0258057 | A1 | 8/2021 | Kim et al. |
| 2021/0385773 | A1 | 12/2021 | Ma et al. |

FOREIGN PATENT DOCUMENTS

| | | | |
|---|---|---|---|
| WO | 2021081997 | A1 | 5/2021 |
| WO | 2021082009 | A1 | 5/2021 |

OTHER PUBLICATIONS

International Search Report and Witten Opinion Issued In PCT/US2023/010365 Mailed Apr. 17, 2023.

Moderator (Mediatek), “Summary #1 of AL 8.15.2 Enhancements to Time and Frequency Synchronization”, 3GPP TSG RAN WG1 #104e, Jan. 25, 2021-Feb. 5, 2021.

Nokia, “Further Views on SMTC Configurations for NTN”, 3GPP TSG-RAN WG2 Meeting #115 Electronic, R2-2107521, Aug. 16-27, 2021, Aug. 6, 2021, XP052034176.

Qualcomm Incorporated, “SMTC and MG Enhancements”, 3GPP TSG-RAN WG2 Meeting #116e, R2-2109972, E-Meeting: Nov. 1-12, 2021, Oct. 22, 2021, XP052066425.

Xiaomi Communications, “Discussion on Control Plane Issues for LOT NTN”, 3GPP TSG RAN WG2 #116, R2-2111030, e-Meeting: Nov. 1-12, 2021.

Xiaomi Communocations, “Discussion on Connected Mode Aspects for NTN”, 3GPP TSG RAN #116, R2-2111028, e-Meeting: Nov. 1-12, 2021, Oct. 22, 2021, XP052067466.

SYNCHRONIZATION SIGNAL MEASUREMENT IN A NON-TERRESTRIAL NETWORK

FIELD OF THE DISCLOSURE

This disclosure relates generally to wireless communications and, more particularly, to synchronizing measurements of signals transmitted from non-terrestrial network nodes such as satellites.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The objectives behind developing the fifth generation (5G) technology include providing a unified framework for such types of communication as enhanced mobile broadband (eMBB), ultra-reliable low-latency communications (URLLC), and massive machine type communication (mMTC).

The 5G technology relies primarily on legacy terrestrial networks. However, the 3rd Generation Partnership Project (3GPP) organization has proposed to extend 5G communications to non-terrestrial networks (NTNs) with 5G new radio (NR) technologies, or with the Long-Term-Evolution (LTE) technologies tailored for the Narrowband Internet-of-Thing (NB-IoT) or the enhanced Machine Type Communication (eMTC) scenarios. In an NTN, an RF transceiver is mounted on a satellite, an unmanned aircraft systems (UAS) also referred to as drone, balloon, plane, or another suitable apparatus. For simplicity, the discussion below refers to all such apparatus as satellites. In addition to satellites, an NTN can include the sat-gateways that connect the Non-Terrestrial Network to a public data network, feeder links between sat-gateways and satellites, service links between satellites, and inter-satellite links (ISL) when satellites form constellations.

A satellite can belong to one of several types based on altitude, orbit, and beam footprint size. The types include Low-Earth Orbit (LEO) satellite, Medium-Earth Orbit (LEO) satellite, Geostationary Earth Orbit (GEO) satellite, UAS platform (including High Altitude Platform Station (HAPS)), and High Elliptical Orbit (HEO) satellite. GEO satellites are also known as the Geosynchronous Orbit (GSO) satellites, and LEO/MEO satellites are also known as non-GSO (NGSO) satellites.

A GSO satellite can communicate with one or several sat-gateways deployed over a satellite targeted coverage area (e.g. a region or even a continent). A non-GSO satellite at different times can communicate with one or several serving sat-gateways. An NTN is designed to ensure service and feeder link continuity between successive serving sat-gateways, with sufficient time duration to proceed with mobility anchoring and hand-over.

A satellite typically generates several beams for a given service area bounded by the field of view. The footprints of the beams depend on the on-board antenna configuration and the elevation angle and typically have an elliptic shape. A satellite can support a transparent or a regenerative (with on board processing) payload. For a transparent payload implementation, a satellite can apply RF filtering and frequency conversion and amplification, and not change the waveform signal. For a regenerative payload implementation, a satellite can apply RF filtering, frequency conversion and amplification, demodulation and decoding, routing, and coding/modulation. This regenerative approach is effectively equivalent to implementing most of the functions of a base station, e.g., a gNB.

NB-IoT and eMTC technologies are expected to be particularly suitable for IoT devices operating in remote areas with limited or no terrestrial connectivity. Such IoT devices can be used in a variety of industries including for example transportation (maritime, road, rail, air) and logistics; solar, oil, and gas harvesting; utilities; farming; environmental monitoring; and mining. However, to ensure the required IoT connectivity, deployment of these technologies requires satellite connectivity to provide coverage beyond terrestrial deployments. Satellite NB-IoT or eMTC is defined in a complementary manner to terrestrial deployments.

To determine whether to initiate a handover or carrier aggregation, for example, a UE can monitor the signal in cells other than the cell in which the UE currently operates, i.e., the serving cell. To this end, base stations generate synchronization signals such as a Synchronization Signal (SS) and Physical Broadcast Channel (PBCH) Block (SSB). Each cell can have a particular configuration of SSB periodicity. According to 3GPP specifications, a UE receives a SSB-based RRM Measurement Timing Configuration (SMTC) for a certain carrier frequency in order to determine the SSB periodicity setting and the burst duration. Further, an SMTC can indicate the timing offset of the SSB burst in a frame. For NR Release 15, 3GPP supports an SMTC periodicity between 5 and 160 ms, and a burst window duration between 1 ms and 5 ms. When a UE performs inter-frequency measurements by receiving and processing SSBs on non-serving frequencies, the UE does not monitor the serving frequency during a time period referred to as the measurement gap.

In contrast to a typical terrestrial network, an NTN can have large propagation delays between UEs and satellites, as well as large variance in these delays. A serving satellite may provide a UE with an SMTC window that does not align with the times when SSB bursts from non-serving satellites reach the UE, which requires certain adjustments in the timing of UE measurements. Further, because satellites move relative to each other (e.g., the distance between the serving satellite and a non-serving satellite changes over time), the UE may encounter gradual timing misalignments, when the propagation delay between a non-serving satellite and the UE effectively moves an SSB burst into an earlier or a later subframe relative to the time pattern that the serving satellite established.

SUMMARY

An example embodiment of the techniques of this disclosure is a method for synchronization signal measurement implemented in a UE. The method includes receiving, by the UE from a non-terrestrial network (NTN), a measurement configuration that indicates (i) a timing pattern according to which a signal source associated with the NTN transmits a synchronization signal and (ii) a timing parameter related to a change in timing alignment between the UE and the signal source; receiving, by the UE from the signal source, the synchronization signal in accordance with the timing pattern and the timing parameter; and processing, by the UE, the synchronization signal.

Another embodiment of these techniques is a user equipment (UE) comprising processing hardware and configured to implement the method above.

Another embodiment of these techniques is a method for configuring synchronization signal measurement at a UE, the method implemented in a serving NTN node and comprising:

receiving, by the NTN node, information related to movement of a neighbor NTN node; and transmitting, by the NTN node, a measurement configuration generated in view of the information, the measurement configuration indicating (i) a timing pattern according to which the neighbor NTN node transmits a synchronization signal and (ii) a timing parameter related to a change in timing alignment between the UE and the neighbor NTN node.

Still another embodiment of these techniques is a non-terrestrial network (NTN) node comprising processing hardware and configured to implement the method above.

DETAILED DESCRIPTION OF THE DRAWINGS

To address potential timing misalignment between a UE and an NTN node such as a non-serving satellite (or a non-connected satellite when the UE is in the RRC_CONNECTED state), the serving (or connected) satellite provides the UE not only with a measurement configuration specifying a time pattern for synchronization signal measurement, but also with a timing parameter related to the timing misalignment. The UE can use this timing parameter to compensate, at least temporarily, for the timing misalignment and/or determine when the timing misalignment requires a new measurement configuration.

In some implementations, the timing parameter is a function that specifies the "drift" of the alignment over time. The function can be a linear function, defined simply by a constant drift parameter, or a non-linear function that specifies different drift amounts for different time intervals. In other implementations, the timing parameter can indicate the amount of time during which the current time pattern remains valid. The UE can use this type of timing parameter to run a timer and request a new measurement configuration upon timer expiration. In yet other implementations, the timing parameter is a sequence of time values for different time intervals (e.g., time pattern $P_1$ can be valid for interval $T_1$, time pattern $P_2$ is to follow $P_1$ and is valid for time interval $T_2$, etc.).

Figure 1:
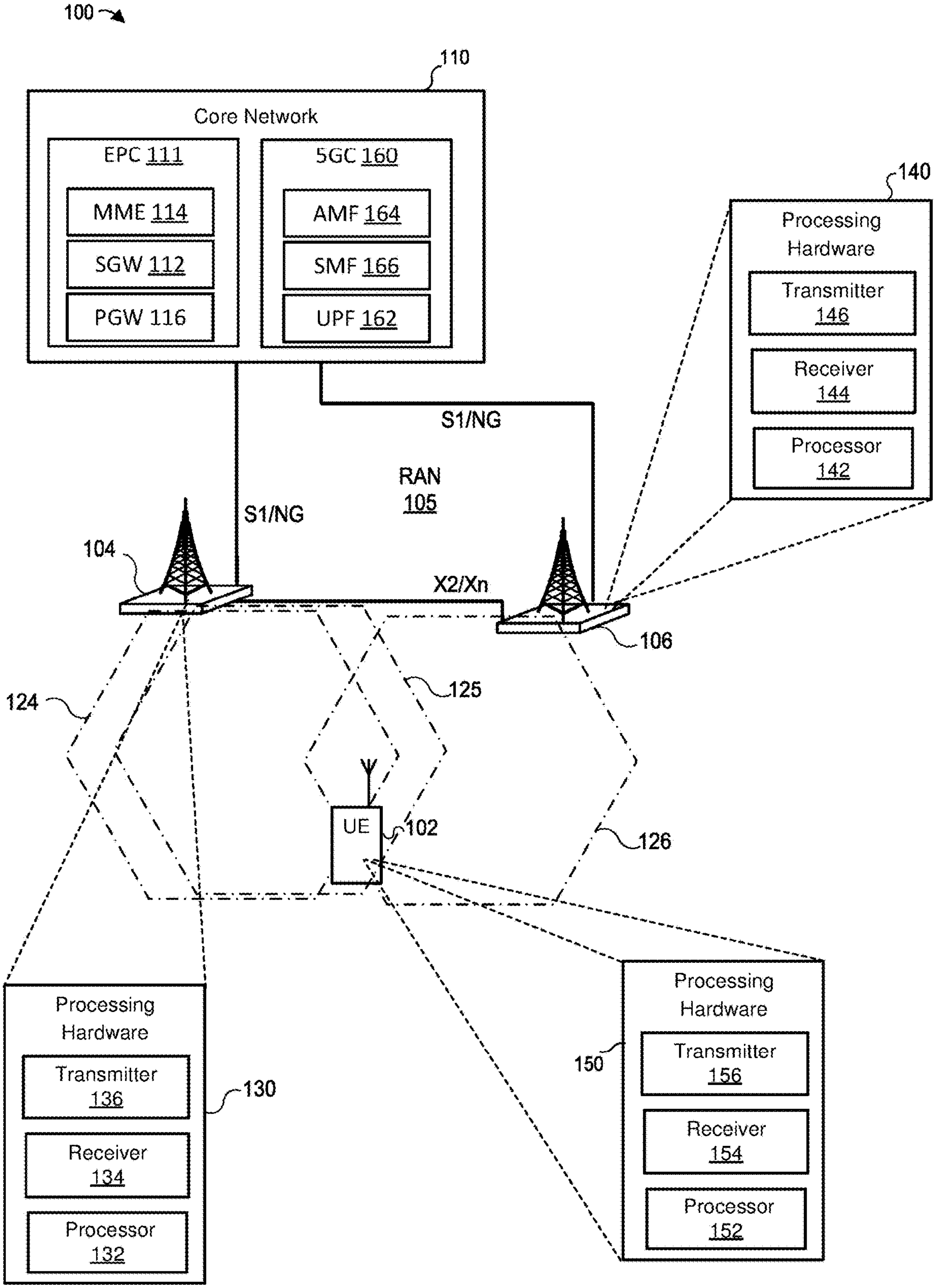
FIG. 1 is a block diagram of an example communication system in which the techniques of this disclosure can be implemented.

Referring first to FIG. 1, an example wireless communication system 100 includes a UE 102, a base station (BS) 104, a base station 106, and a core network (CN) 110. The base stations 104 and 106 can operate in a RAN 105 connected to the core network (CN) 110 and other base station components, such as satellites, as will be described with reference to FIGS. 3A and 3B. The CN 110 can be implemented as an evolved packet core (EPC) 111 or a fifth generation (5G) core (5GC) 160, for example. The CN 110 can also be implemented as a sixth generation (6G) core and future evolutions.

The base station 104 covers a cell 124, and the base station 106 covers a cell 126. If the base station 104 is a gNB, the cell 124 is an NR cell. If the base station 104 is an ng-eNB or eNB, the cell 124 is an evolved universal terrestrial radio access (E-UTRA) cell. Similarly, if the base station 106 is a gNB, the cell 126 is an NR cell, and if the base station 106 is an ng-eNB or eNB, the cell 126 is an E-UTRA cell. The cells 124 and 126 can be in the same Radio Access Network Notification Areas (RNA) or different RNAs. In general, the RAN 105 can include any number of terrestrial and non-terrestrial base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 106 connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, and the base station 106 supports a cell 126. The cells 124 and 126 can partially overlap, so that the UE 102 can select, reselect, or hand over from one of the cells 124 and 126 to the other. Satellite base stations may provide additional RAN 105 coverage as described with reference to FIG. 7. To directly exchange messages or information, the base station 104 and base station 106 can support an X2 or Xn interface. In general, the CN 110 can connect to any suitable number of terrestrial and non-terrestrial base stations supporting NR cells and/or EUTRA cells.

As discussed in detail below, the UE 102 and/or the RAN 105 may utilize the techniques of this disclosure when the radio connection between the UE 102 and the RAN 105 is suspended, e.g., when the UE 102 operates in an inactive or idle state of the protocol for controlling radio resources between the UE 102 and the RAN 105. For clarity, the examples below refer to the RRC_INACTIVE or RRC_IDLE state of the RRC protocol. The UE 102 may further utilize the techniques of this disclosure when the radio connection between the UE 102 and the RAN 105 is disconnected and operating in a PSM where no radio resource control (RRC) protocol relationship exists between the UE and the network.

The base station 104 is equipped with a transceiver and processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a processor 132 to process data that the base station 104 will transmit in the downlink direction, or process data received by the base station 104 in the uplink direction. The processing hardware 130 can also include a transmitter 136 configured to transmit data in the downlink direction. The processing hardware further can include a receiver 134 configured to receive data in the uplink direction. The base station 106 can include generally similar components. In particular, components 140, 142, 144, and 146 of the base station 106 can be similar to the components 130, 132, 134, and 136, respectively.

The UE 102 is equipped with a transceiver and processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a processor 152 to process data that the UE 102 will transmit in the uplink direction, or process data received by UE 102 in the downlink direction. The processing hardware 150 can also include a transmitter 156 configured to transmit data in the downlink direction. The processing hardware further can include a receiver 154 configured to receive data in the uplink direction.

Figure 2:
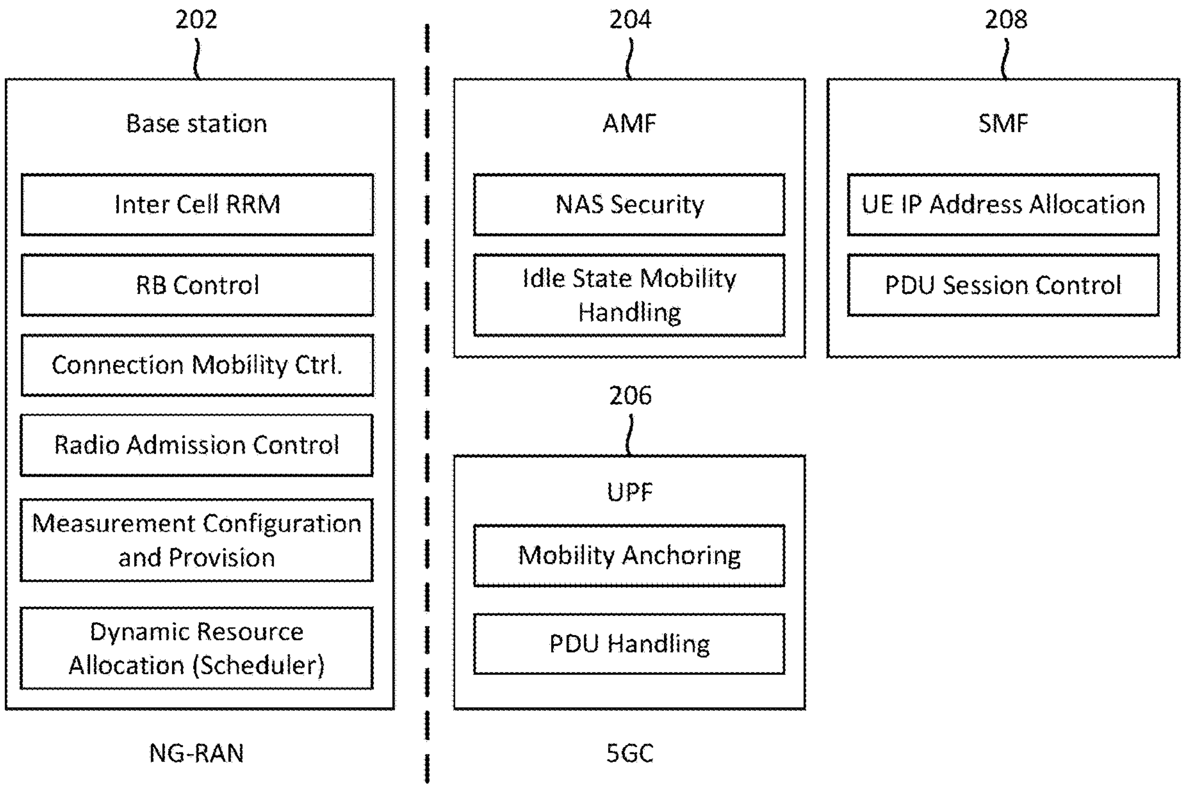
FIG. 2 illustrates a functional split between a radio network and a core network, according to which the system of FIG. 1 can operate.

As illustrated in FIG. 2, various functionality can be distributed between the RAN 105 and the 5GC 160, and further distributed between different components of the 5GC 160, such as the AMF 164 and the SMF 166.

In particular, a base station 202 (e.g., the base station 104 or 106) can host the following main functions: Radio Resource Management such as Radio Bearer Control, Radio Admission Control, Connection Mobility Control, dynamic allocation of resources to UEs in both up-link and downlink (scheduling); IP header compression, encryption and integrity protection of data; selection of an AMF at UE attachment when no routing to an AMF can be determined from the information provided by the UE; routing of User Plane data toward the UPF(s); routing of Control Plane information towards the AMF; connection setup and release; scheduling and transmission of paging messages; scheduling and transmission of system broadcast information (originated from the AMF or OAM); measurement and measurement reporting configuration for mobility and scheduling; transport level packet marking in the uplink; session management; support of network slicing; QoS flow management and mapping to data radio bearers; support of UEs in RRC_INACTIVE state; distribution of NAS messages; radio access network sharing; Dual Connectivity; and interworking between NR and E-UTRA.

The AMF 204 can host the following functionality: NAS signaling termination; NAS signaling security; AS security control; inter-CN node signaling for mobility between 3GPP access networks; Idle mode UE Reachability (including control and execution of paging retransmission); Registration Area management; support of intra-system and inter-system mobility; access authentication; access authorization including checking of roaming rights; mobility management control (subscription and policies); support of network slicing; and SMF selection.

The UPF 206 can host the following functionality: anchor point support for Intra-/Inter-RAT mobility (when applicable); external PDU session point of interconnect to data network support; packet routing & forwarding; packet inspection and user plane part of policy rule enforcement; traffic usage reporting; uplink classification to support routing traffic flows to a data network; branching point to support multi-homed PDU session; QoS handling for user plane, e.g. packet filtering, gating, UL/DL rate enforcement; uplink rraffic verification (SDF to QoS flow mapping); and downlink packet buffering and downlink data notification triggering.

Finally, the SMF 208 can provide session management; UE IP address allocation and management; selection and control of UP function; configuration of traffic steering at User Plane Function, UPF, to route traffic to proper destination; control of policy enforcement and QoS; and downlink data notification.

Figure 3A:
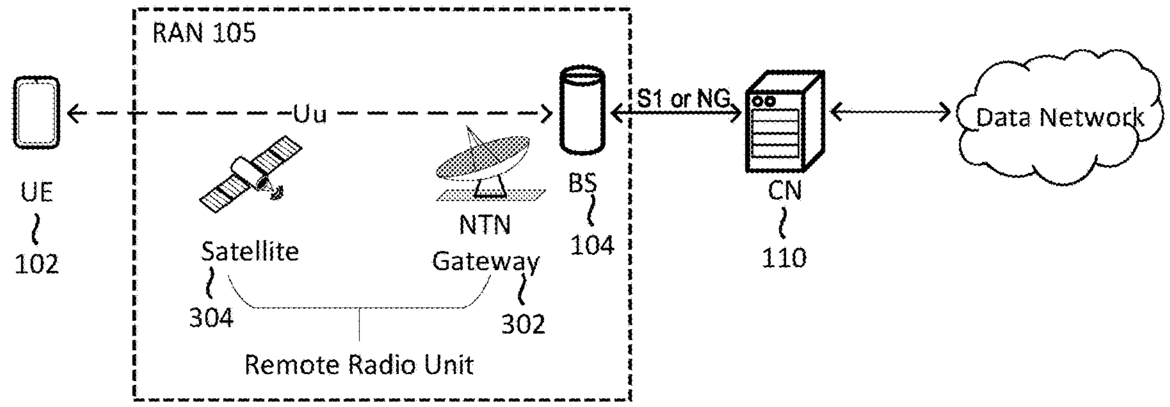
FIG. 3A is a block diagram of an example NTN node with transparent payload implementation.

FIG. 3A illustrates a certain type of NTN deployment referred to as transparent payload architecture, which involves a satellite gateway 302 and a "transparent" satellite 304 for extending the range of the Uu interface. This NTN deployment may be incorporated into the RAN 105 of FIG. 1A as another base station or an extension of the base station 104 (or the base station 106). The satellite 304 implements a frequency conversion and a Radio Frequency (RF) amplifier in both the uplink and downlink directions. The satellite function is similar to that of an analogue RF repeater. Thus, the satellite 304 repeats the Uu radio interface from the feeder link (between the NTN gateway and the satellite) to the service link (between the satellite and the UE) in the downlink direction and vice versa in the uplink direction. The Satellite Radio Interface (SRI) on the feeder link is the Uu, and the NTN gateway 302 supports all necessary functions to forward the signal of the Uu interface. The NTN gateway 302 operate at the same site as the base station (e.g., eNB, gNB) 104 location, or connect to the base station 104 at a distance via a wired link. It is also possible to connect more than one NTN gateway to a base station. Different transparent satellites may be connected to the same base station on the ground, via the same NTN gateway, or via different NTN gateways.

Figure 3B:
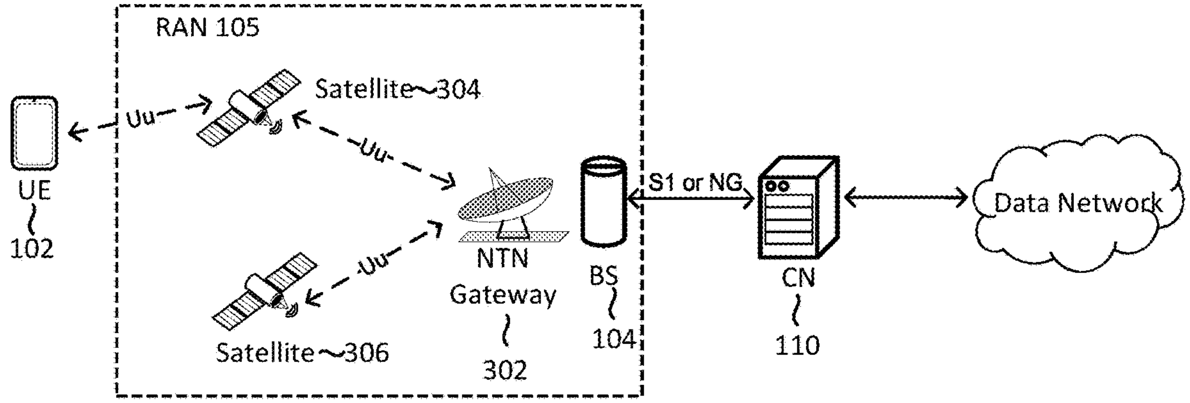
FIG. 3B is a block diagram of an example NTN implementation in which a base station connects to multiple satellites via the same sat-gateway.

FIG. 3B illustrates the implementation in which two different satellites (304 and 306) connect to the same base station 104 via the same NTN gateway 302, and these two satellites (304 and 306) are covering the Earth surface using two different Physical Cell IDs (PCIs).

Figure 4A:
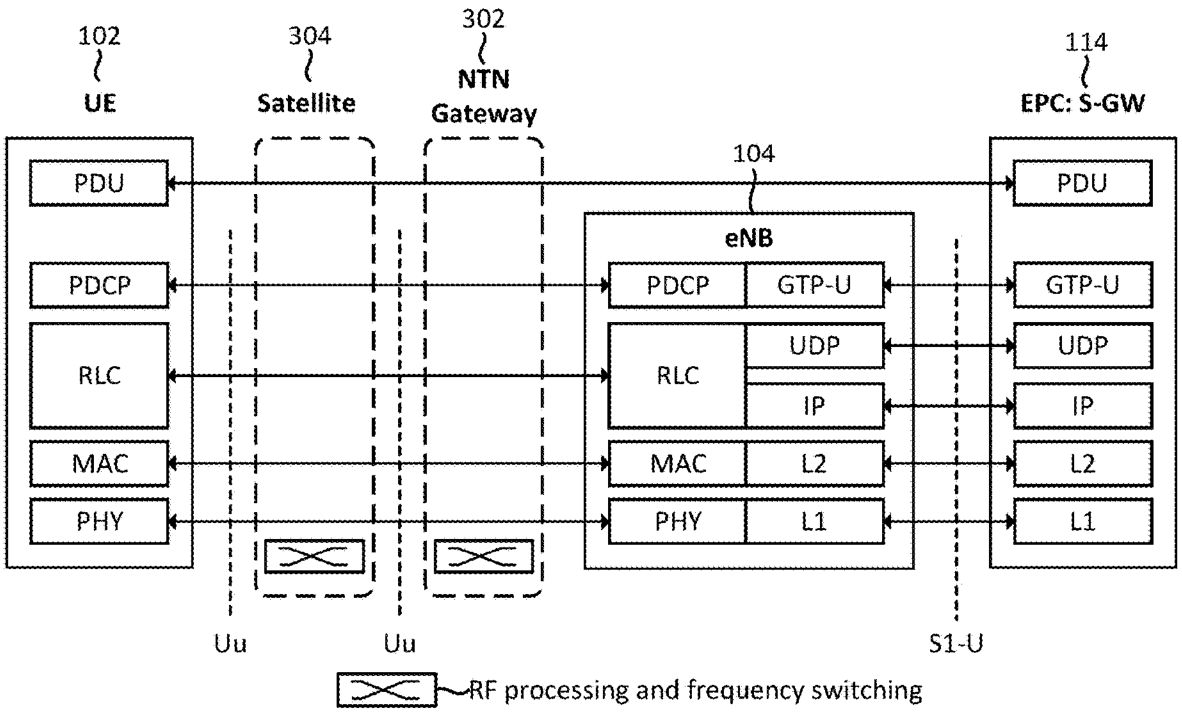
FIG. 4A illustrates an example user plane protocol stock for use with the architecture of FIG. 3A.
Figure 4B:
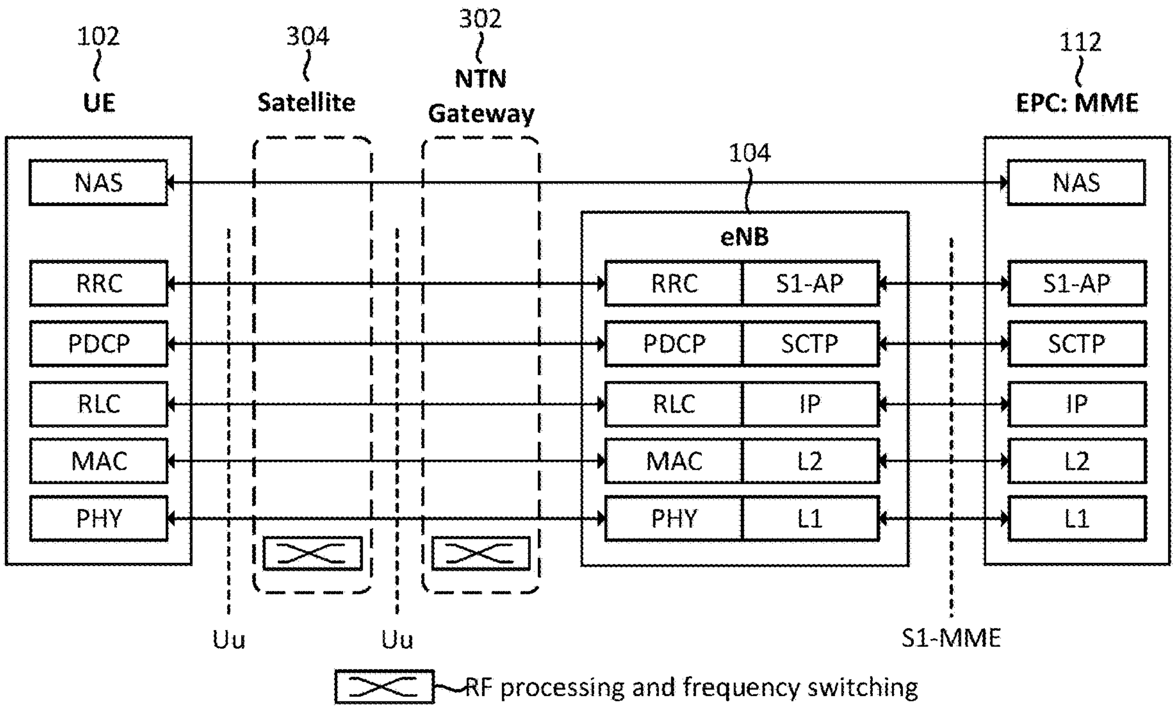
FIG. 4B illustrates an example control plane protocol stock for use with the architecture of FIG. 3A.

Next, FIG. 4A illustrates an NTN user-plane protocol stack involving the UE 102, the satellite 304, the NTN gateway 302, the base station 104, and the EPC S-GW 112 (or 5GC SMF 166). The NTN user-plane protocol stack is similar to that of the terrestrial network (TN), except that the configuration of FIG. 4A illustrates two additional nodes, the satellite 304 and the NTN gateway 302, operating in the middle of the Uu interface. Similarly, the NTN control plane protocol stack illustrated of FIG. 4B is also generally analogous to that of the terrestrial network counterpart shown in FIG. 2B.

Referring generally to FIGS. 1-4B, NTN supports at least three types of service links NTN, described in terms of satellite movement patterns: (i) Earth-fixed: provisioned by beam(s) continuously covering the same geographical areas all the time (e.g., the case of GEO/GSO satellites); (ii) Quasi-Earth-fixed: provisioned by beam(s) covering one geographic area for a limited period and a different geographic area during another period (e.g., the case of LEO/MEO satellites capable of using steerable beams); and (iii) Earth-moving: provisioned by beam(s) whose coverage area slides over the Earth surface (e.g., the case of LEO/MEO satellites using fixed or non-steerable beams).

With LEO/MEO satellites, a base station can provide either quasi-Earth-fixed cell coverage or Earth-moving cell coverage. With GEO satellites, the base station can provide Earth fixed cell coverage.

Although the transparent payload architecture illustrated in FIGS. 3A and 3B is the current focus of the 3GPP development, the regenerative payload architecture that places some of the base station functions on the satellite is also a possible NTN deployment in the future. In such an architecture, the Uu only exists between the satellite and the UE. In general, the techniques of this disclosure can apply to the transparent payload architecture as well as the regenerative payload architecture.

Again referring generally to FIGS. 1-4A, the UE 102 operating in a certain cell must be able to detect reference signals from the neighboring cells and measure the strength of the reference signals to be able to switch to a qualified neighboring cell when needed (i.e., when the serving cell is no longer able to serve the UE due to poor signal reachability), or in order to add a new Carrier Component (CC). The reference signal a base station can use for this purpose with the NR radio interface is the synchronization signal (SS) and physical broadcast channel (PBCH) block, abbreviated as SSB. Unlike the LTE radio interface in which a base station transmits SS every 5 ms, 5G NR allows each base station to transmit the SSB burst with different time patterns, with the longest periodicity of up to 160 ms. This allows the network to configure the SSB transmission in a more dynamic manner dependent on the actual usage and channel condition.

This approach helps to avoid unnecessary measurements and reduce the power consumption of a UE. However, this flexibility comes at the cost of the additional signaling required to inform the UE when to perform measurement on a measurement target. Without the additional signaling, the UE would need to assume the worst-case scenario (in the implementation above, the 5 ms periodicity) to determine when to measure the target. As a result, the UE achieves no power saving gain. This additional signaling in 5G NR is known as "SSB based measurement timing configuration (SMTC)," which contains a periodicity setting ranging from 5 ms to 160 ms and a duration setting ranging from 1 ms to 5 ms.

The network does not need to align the SMTC periodicity setting with the actual SSB burst periodicity. For instance, the SMTC periodicity can be set to a value larger than the SSB burst periodicity to further reduce the power consumption of the UE. In addition to the periodicity and duration settings, the SMTC also indicates a timing offset to inform the UE of the exact subframe where the UE should start monitoring the SSB burst, which occurs repeatedly according to the periodicity setting. A base station can signal the periodicity and the timing offset settings together, in one measurement object, as a single parameter periodicityAndOffset.

There can be a relatively small timing difference between the timing of the Primary Cell (PCell) and the timing of the measurement target, in part due to the propagation delay difference. A terrestrial network can ignore this small timing difference, as the propagation delay difference is small and hence requires no adjustment in the timing offset setting. Accordingly, 3GPP TS 38.331 (v16.6.0) currently specifies only one timing offset for the measurement object configuration. For anon-terrestrial network, however, the propagation delay between a satellite and a UE could be longer (e.g., up to 25.77 ms), and the variance for different satellites can be significant (e.g., between 8 ms and 25.77 ms).

A UE and/or a base station can use an individual timing offset setting associated with each respective measurement target (i.e., a satellite) configured in a measurement object. This approach can result in multiple timing offsets settings or even multiple SMTCs configured in one measurement object. Although a measurement object can support two SMTCs, these SMTCs currently must share the same timing offset setting and hence cannot address the propagation delay issue in an NTN discussed above.

Figure 5:
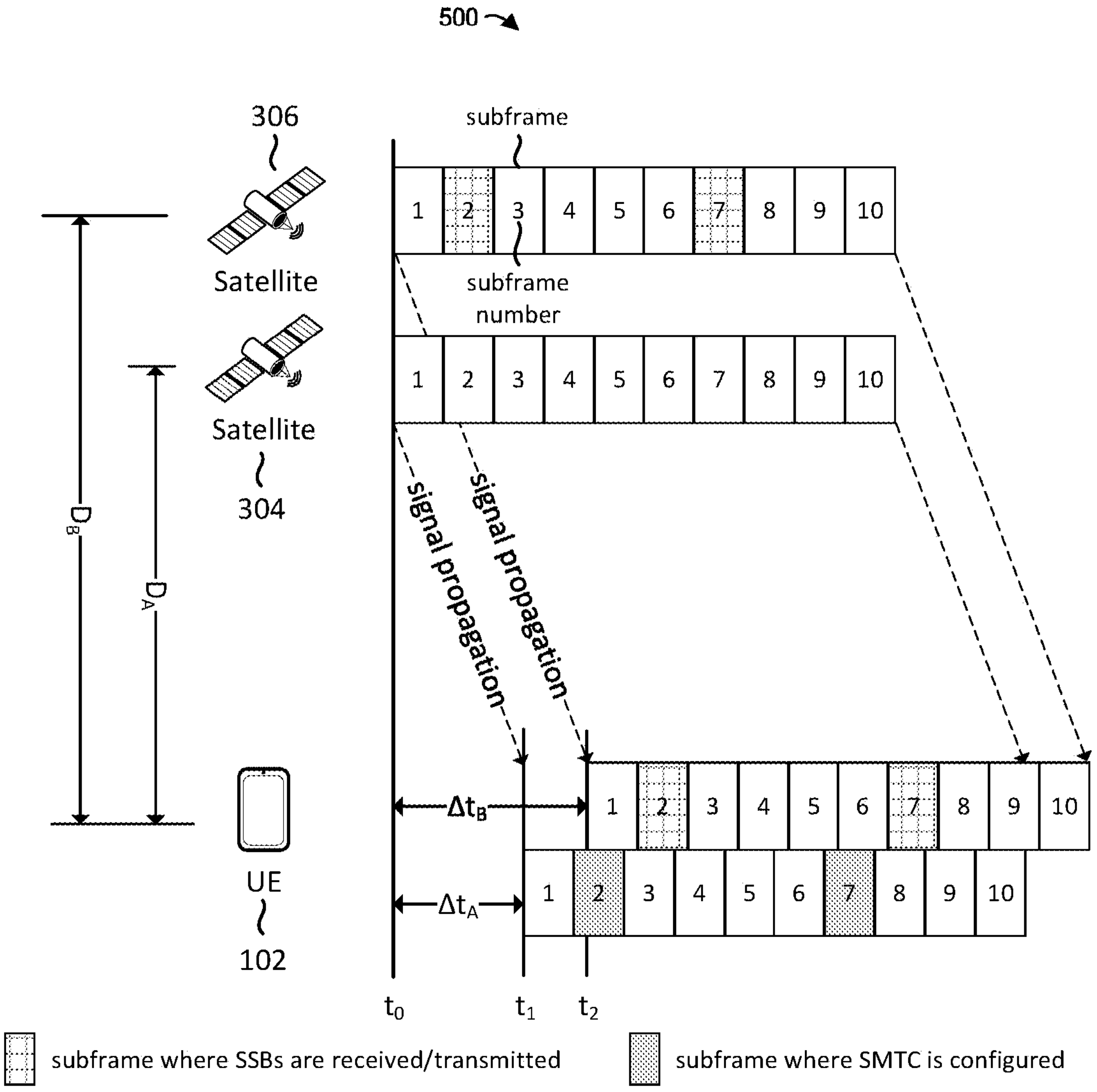
FIG. 5 illustrates an example scenario in which a UE receives signals from a serving satellite and a non-serving satellite with different propagation delays.

Now referring to a scenario 500 of FIG. 5, the satellite 304 currently is serving the UE 102 and has configured the UE 102 with a measurement object to perform the measurement on the cells of the neighboring satellites 306. This discussion assumes the satellites 304 and 306 are fully synchronized in timing and can connect to the same base station or different base stations. The distance between the UE 102 and the serving satellite 304 is $D_A$, and the distance between the UE 102 and the target satellite 306 is $D_B$, where in this example $D_B > D_A$. The propagation delay between the UE 102 and the serving satellite 304 is $\Delta t_A$, and the propagation delay between the UE 102 and the target satellite 306 is $\Delta t_B$, where $\Delta t_B$ exceeds $\Delta t_A$ by a small amount over the duration of one subframe. For the purposes of this discussion, one can further assume that the satellite 306 emits an SSB burst at subframe 2 and subframe 7 for one subframe duration.

According to the current 3GPP specifications, the serving satellite 304 configures the UE 102 with an SMTC in which the periodicity equals 5 subframes, the offset equals 2 and the duration equals 1 subframe. The existing techniques do not account for the propagation delay difference. However, with this configuration, the UE 102 cannot measure the SSB from the satellite 306 because the actual SSB burst arrives at the UE 102 during subframe 3 and subframe 8. To make the UE 102 capable of receiving the SSB from the satellite 306, the serving base station 104 should account for the difference between $\Delta t_A$ and $\Delta t_B$ when configuring the offset in the SMTC.

For the serving base station 104 to determine the propagation delay difference accurately, the serving base station 104 may use the geolocation of the UE 102 (e.g., a set of Global Positioning Service (GPS) coordinates or other suitable coordinates) and the ephemeris information for the satellite 306. In the example scenario 500, after determining the geolocation of the UE 102 and the ephemeris information for the satellite 306, the base station 104 configures the SMTC with the offset equaling 3 and with the duration equaling 1 or 2 subframes, so that the UE can detect and measure the SSB from the satellite 306 properly. Because the network (the RAN 105 and/or the CN 110) may configure the UE 102 to perform measurements on multiple measurement targets, such as multiple satellites, using a single measurement object, in some implementations the base station 104 includes multiple offsets associated with an SMTC or even include multiple SMTCs in one measurement object.

Further, if the network can configure an accurate offset in one SMTC based on the geolocation information and the ephemeris information, the SMTC could be valid only for a short period of time due to fast movement of the satellite. To compensate for the rapid offset change due to the fast satellite movement, the network could provide the up-to-date SMTC configuration to UE 102 very frequently.

Figure 6:
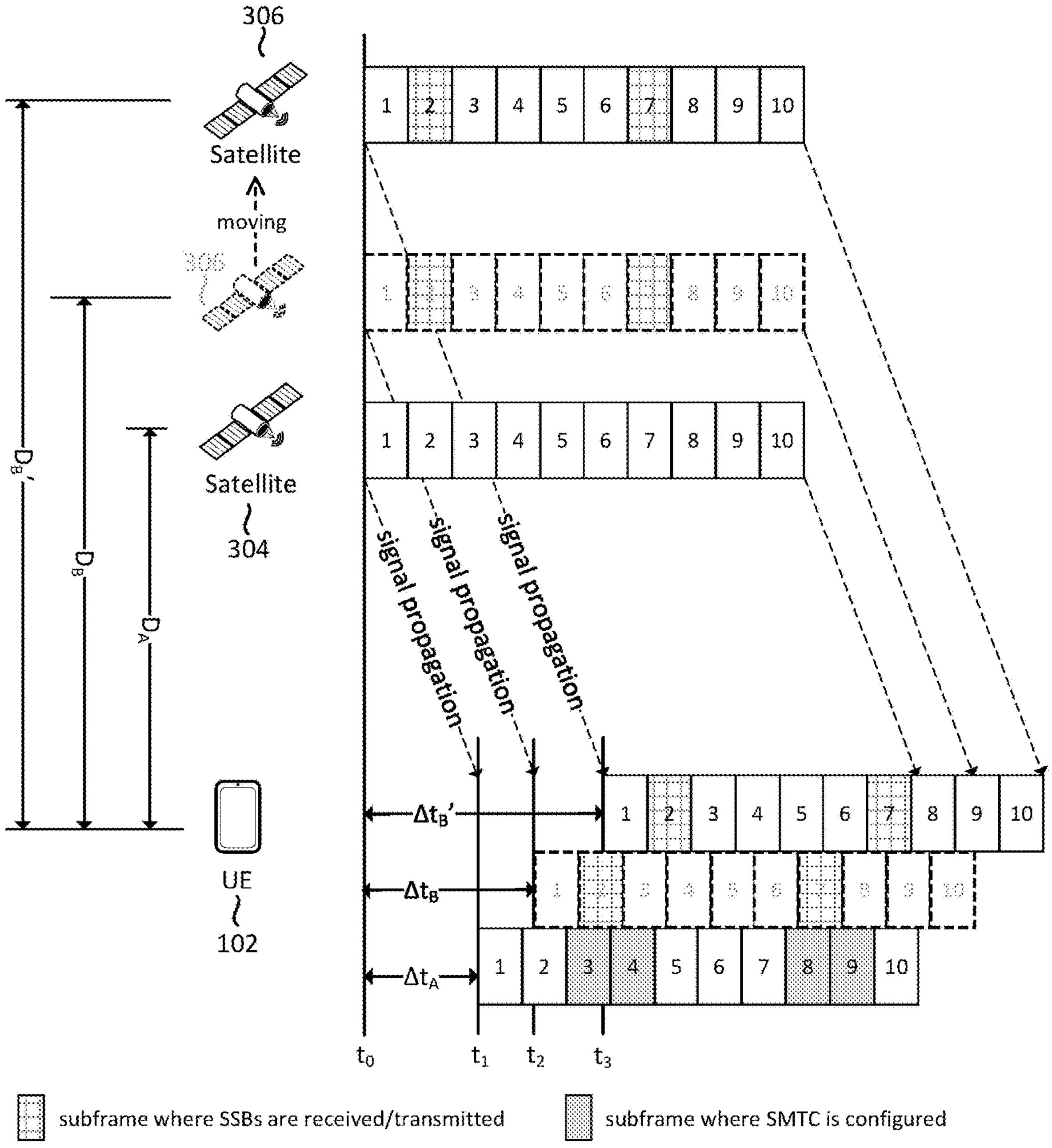
FIG. 6 illustrates an example scenario in which the UE of FIG. 5 receives a signal from the non-serving satellite with increasing delays due to movement of the non-serving satellite generally away from the UE.

FIG. 6 illustrates the same configuration as described in FIG. 5, but at a later time. Here, the satellite 306 has moved farther away from the UE 102, from the distance $D_B$ to a greater distance $D_B'$, which results in an increase of the propagation delay from $\Delta t_B$ to $\Delta t_B'$. As a result, the SSB bursts leaving the satellite 306 at subframe 2 and subframe 7 will arrive at the UE 102 at subframe 5 and subframe 10, respectively. Because the network has previously configured the UE 102 to receive SSB bursts starting at subframe 3 and subframe 8, the UE 102 cannot receive and measure the SSB from the satellite 306 at the new time instance.

To allow the UE 102 to detect the SSB from a neighboring cell associated with either a quasi-Earth-fixed or an Earth-moving satellite, the network could provide up-to-date SMTCs to the UE 102 in a very frequent manner, which results in a significant overhead, especially considering the typically very large number of UEs operating in the connected state within satellite coverage. To address this concern and save signaling overhead, the UE 102 and the network of FIG. 1 utilize an SMTC with an ability to shift or adjust the configured values in time, such that the base station 104 and the UE 102 have a shared understanding of how the configured values in the SMTC shift or adjust. Further, in some implementations, the network indicates to the UE 102 when an SMTC is still valid and applicable. The network can provide this indication along with the SMTC. Using this information, the UE 102 can discard the SMTC setting and stop performing the measurement when the configuration is no longer valid, which reduces power consumption at the UE 102.

The base station 104 in some implementations also provides the SMTC in a system information (SI) message for the UEs currently operating in the idle state (RRC_IDLE) or the inactive state (RRC_INACTIVE), so that these UEs can conduct the measurement on SSBs from the neighboring cells as part of cell reselection, for example (i.e., when the neighboring satellites are moving constantly). When the neighboring cells are associated with quasi-Earth-fixed or Earth-moving satellites, the base station may not be able to update the SMTC timely in the SI, because updating a value in SI becomes possible only in the next modification period, which typically takes hundreds or thousands of seconds. In this case, a UE operating in the idle or inactive state can autonomously adjust the SMTC settings after a certain amount of time.

However, an approach based on the UE 102 autonomously adjusting the SMTC setting has several drawbacks. First, this approach requires the UE 102 to have the full and up-to-date knowledge of the ephemeris to estimate the propagation delays between the UE 102 and the neighboring satellites, which is not always possible (especially for a UE operating in the idle or inactive state). Second, the UE 102 would consume a lot of power by frequently determining its current geographic location and then estimating the distance and/or propagation delay between the UE 102 and any neighboring satellite (which, again, is undesirable in the idle or inactive state). For these reasons, in the scenarios discussed below, the network generates instructions indicating how the UE 102 should adjust the SMTC, thereby reducing the burden on the UE 102.

Figure 7:
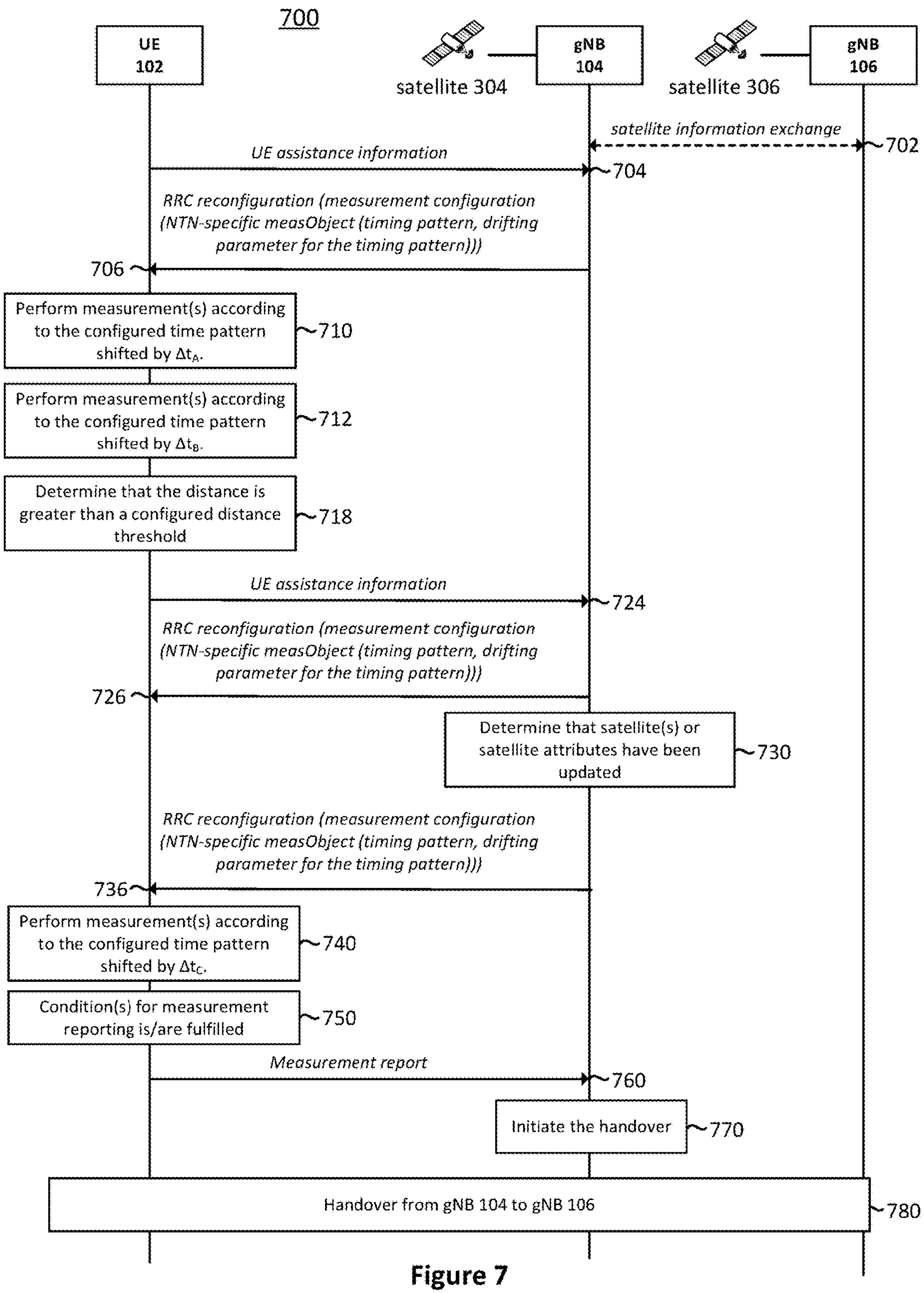
FIG. 7 illustrates an example scenario in which a serving satellite provides, to a UE operating a connected state, a drifting parameter along with a measurement configuration.

Next. FIG. 7 illustrates a scenario 700 in which a UE operating in the connected state automatically updates the SMTC without requiring that the network repeatedly provide signaling for the update. The discussion below refers to gNBs 104 and 104, but in general this technique can be implemented in a base station of any suitable type.

The UE 102 initially is connected to the gNB 104 via a service link of the satellite 304, and the UE 102 is in the connected state (e.g., RRC_CONNECTED). Thus, the gNB 104 is the serving base station of the UE 102, and the satellite 304 is the serving satellite of the UE 102. The serving satellite 304 is close to another satellite 306 associated with the gNB 106. The gNB 104 and gNB 106 in this scenario can communicate with each other via the Xn interface (shown in FIG. 1). Using this Xn interface, the serving gNB 104 exchanges 702 the satellite ephemeris information with its neighbor nodes, gNB 106, to obtain the location and movement information for the satellites (e.g., satellite 306) associated with the gNB 106.

As an alternative to the exchanging 702 of ephemeris information, the gNB 104 can acquire the satellite ephemeris information from the core network (e.g., from the AMF) or from the Operations, Administration and Maintenance (OAM), or receive the relevant satellite ephemeris information at set-up or deployment and store the ephemeris information in a persistent memory. The gNBs 104 and 106 also can exchange 702 other information such as SSB configurations, for example.

The UE 102 transmits 704 UE assistance information to the gNB 104, to report the location information for the UE 102 or to report the propagation delay between the UE 102 and a relevant satellite. The UE assistance information can conform to the format specified in 3GPP TS 38.331 (v16.6.0), section 5.7.4, or alternatively the UE assistance information can be a UL DCCH message dedicated to, and defined specifically for the purpose of, reporting the UE location information or reporting the observed propagation delay between UE 102 and a satellite. By transmitting 704 the UE assistance information, the UE 102 informs the gNB 104 of the current geographic location of the UE. If the UE 102 reports 704 only the propagation delay information, the gNB 104 in some implementations autonomously derives the current geographic location of the UE 102 using the received propagation delay information.

In response to receiving 704 the UE assistance information, the gNB 104 transmits 706 an RRC reconfiguration command (e.g., RRCReconfiguration) to the UE 102. The command includes a measurement configuration, which in turn includes an NTN-specific measurement object with at least an SMTC describing the SSB transmission pattern of the neighbor satellite 306. The gNB 104 can generate the content of the SMTC using the SSB configuration (e.g., the periodicity, the time offset, the duration configuration) received from the gNB 106, the geographic location of the UE 102, and the satellite ephemeris information obtained earlier.

The SMTC included in the NTN-specific measurement object can include periodicity, a time offset ($offset_{init}$), and a duration setting. The gNB 104 can determine the time offset setting ($offset_{init}$) based on the time offset of the SSB configuration provided by gNB 102, the distance/propagation delay between the serving satellite 304 and UE 102, and the distance/propagation delay between the neighboring satellite 306 and UE 102. The SMTC in the NTN-specific measurement object may also contain a drifting configuration instructing the UE 102 regarding an adjustment and/or a shift to the time offset setting of the SMTC, which can be a function of time. The drifting configuration may include a drifting rate parameter $D_{306}$, which indicates the amount of time shift for a time offset setting per unit of time. In an example implementation, the UE 102 multiplies the drifting rate parameter $D_{306}$ by the time elapsed ($T_{elapsed}$) since the time the UE 102 last received a measurement configuration to obtain a drift result (i.e., $D_{306}*T_{elapsed}$), and adds the drift result to the initial time offset ($offset_{init}$) received from the SMTC to obtain an actual time offset (i.e., $offset_{actual}=offset_{init}+D_{306}*T_{elapsed}$). The UE 102 then applies the actual time offset ($offset_{actual}$) to determine the timing of the SMTC for conducting the measurement. When formatting the measurement configuration, the gNB 104 also can place the drifting configuration outside the SMTC but inside the NTN-specific measurement object, if the drifting rate configuration is applicable to all the SMTCs within the NTN-specific measurement object.

When the $offset_{actual}$ value the UE 102 determines upon receiving 706 the RRC reconfiguration message is not an integer, the UE 102 can round the value up or down to a nearest integer. Alternatively, the UE 102 can round the non-integer $offset_{actual}$ down to a nearest integer, and then increase the duration setting of the SMTC by one subframe. The drifting rate parameter $D_{306}$ could have a positive value or a negative value, depending on whether satellite 306 is moving closer toward the UE 102 (in which case $D_{306}$ is negative) or farther away from the UE 102 (in which case $D_{306}$ is positive). The drifting configuration may contain more than one drifting parameter if the drifting/shifting calculation is not a linear function of the time elapsed (e.g., $offset_{actual}=offset_{init}+D_{306A}*T_{elapsed}^2+D_{306B}*T_{elapsed}$+constant value). To facilitate the calculation of the elapsed time at the UE 102, the gNB 104 can further provide a reference timing (e.g., a UTC timing or a system frame number plus a subframe number) along with the SMTC to the UE 102. When the RRC reconfiguration of event 706 includes the reference timing, $t_{ref}$, the UE 102 can obtain the elapsed time based on the calculation $t_{elapsed}=t_{now}-t_{ref}$, where $t_{now}$ denotes the current time on the UE side.

After receiving 706 the measurement configuration, the UE 102 performs 710 the measurement on the SSB from the satellite 306. Assuming the time difference between events 706 and 710 is $t_A$, the UE 102 conducts the SSB measurement by shifting the time pattern configured in the SMTC by $\Delta t_A$, where $\Delta t_A=D_{306}*t_A$ (assuming the drifting function is a linear function of the time elapsed).

Subsequently to performing 710 the measurement(s), the UE 102 performs 712 another measurement on the SSB from the satellite 306. Assuming the time difference between events 706 and 712 is $t_B$ ($t_B>t_A$), the UE 102 conducts the SSB measurement by shifting the time pattern configured in the SMTC by $\Delta t_B$, where $\Delta t_B=D_{306}*t_B$ (assuming the drifting function is a linear function of the time elapsed).

Subsequently to performing 710 and 712 the measurements, the UE 102 detects 718 that it has moved a distance greater than a certain distance threshold value, which the UE 102 can receive as part of a measurement configuration from the gNB 104, in a system information via a broadcast from the gNB 104, or from the memory as a hardcoded value consistent with a 3GPP specification. The UE 102 then transmits 724 UE assistance information to the gNB 104, to report the current location of the UE 102 or to report the propagation delay between the UE 102 and a relevant satellite (which can be any satellite the UE 102 observes at its current location).

In response to receiving 724 the UE assistance information, the gNB 104 can transmit 726, to the UE 102, an RRC reconfiguration command including an updated measurement configuration. The updated measurement configuration can contain at least an updated NTN-specific measurement object including at least an updated SMTC. The gNB 104 can update the content of the SMTC (i.e., the periodicity, the $offset_{init}$, the duration, and the drifting configuration) based on the SSB configuration (i.e., the periodicity, the time offset, and the duration configuration) received from the gNB 106, the new UE geographic location reported/determined received 724 from the UE, the satellite ephemeris information obtained during the exchange 702 or earlier, and the new satellite location of the satellite 304 and/or satellite 306.

The gNB 104 detects 730 that the satellite 304 and/or the satellite 306 has moved to a new location, and that the SMTC the gNB 730 previously provided 726 to the UE 102 is no longer applicable. The gNB 104 then transmits 736, to the UE 102, another RRC reconfiguration command including an updated measurement configuration. The updated measurement configuration can include an updated NTN-specific measurement object including at least an updated SMTC. The gNB 104 can update the content of the SMTC similar to the example above.

Upon receiving 736 the updated measurement configuration, the UE 102 can perform 740 measurements on the SSB from the satellite 306. Assuming the time difference between events 736 and 740 is $t_C$, the UE 102 performs 740 the SSB measurement by shifting the time pattern configured in the SMTC by $\Delta t_C$, where $\Delta t_C=D_{306}*t_C$ (assuming the drifting function is a linear function of the time elapsed).

After performing 740 the measurement(s), the UE 102 can determine 750 that the triggering event for measurement reporting has occurred (e.g., the signal strength of the satellite 306 is now greater than the signal strength of the satellite 304 by more than a threshold value) for at least a duration indicated in the 'timeToTrigger' parameter. The UE 102 accordingly transmits 760 a measurement report to the gNB 104. The UE 102 can format the measurement report according to the reporting configuration received 736 earlier.

Upon receiving the measurement report, the gNB 104 can determine to initiate 770 a handover of the UE 102 to the gNB 106. The gNB 104 then can participate in a handover procedure 780 that includes such steps as (i) sending a HANDOVER REQUEST message to the gNB 106, (ii) receiving a HANDOVER REQUEST ACKNOWLEDGE message from the gNB 106, and (iii) transmitting an RRC reconfiguration command including a reconfigurationWith-Sync IE to the UE 102. Upon receiving the RRC reconfiguration command with the reconfigurationWithSync IE, the UE 102 can initiate the procedure for connecting to the gNB 106, which can include (i) synchronizing with the gNB 106 and obtaining the PBCH from the gNB 106, (ii) performing a contention-free random access (CFRA) procedure by sending a pre-allocated preamble to the gNB 106, and (iii) sending the an RRC reconfiguration complete message (e.g., RRCReconfigurationComplete) to the gNB 106 using an uplink grant from the CFRA procedure.

In some implementations, the satellite 306 can connect to the gNB 104 instead of the gNB 106. In such cases, the HANDOVER REQUEST message and HANDOVER REQUEST ACKNOWLEDGE message can be omitted.

Figure 8:
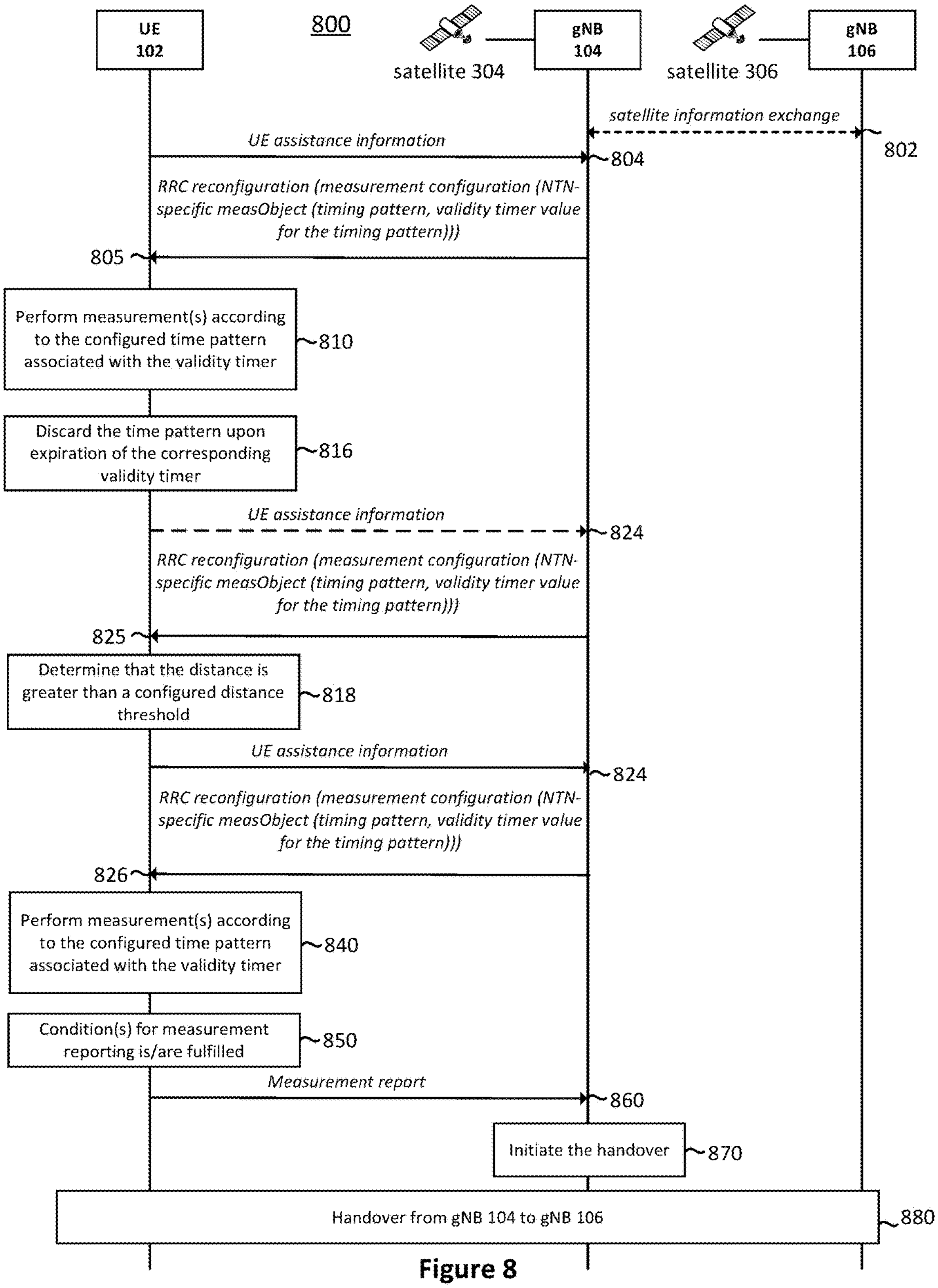
FIG. 8 illustrates an example scenario in which a serving satellite provides, to a UE operating a connected state, the value for a validity timer along with a measurement configuration.

Next, FIG. 8 illustrates a scenario 800 in which a base station provides a validity timer to a UE rather than a drifting parameter of FIG. 7, so that the UE can discard the SMTC upon timer expiration or countdown to zero.

Similar to the scenario 700, the UE 102 initially operates in the connected state, with the gNB 104 and the satellite 304 operating as the serving base station and the serving satellite, respectively; the satellites 304 and 306 are relatively close; and the gNBs 104 and 106 can communicate via an Xn interface. Event 802 is similar to event 702, and event 804 is similar to event 704.

The gNB 104 transmits 805 an RRC reconfiguration command to the UE 102. The RRC reconfiguration command is similar to the RRC reconfiguration command of event 704, but according to this implementation the gNB 104 includes in the SMTC a validity timer $T_{valid\_i}$ which the UE 102 is to activate (i.e., start running) upon receiving 805 the measurement configuration. While $T_{valid\_i}$ is running, the corresponding SMTC remains valid, and the UE 102 can conduct the measurement according to the time pattern of the SMTC. However, when $T_{valid\_i}$ expires, the UE 102 is to discard the corresponding SMTC. Each SMTC in the NTN-specific measurement object can be associated with an individual validity timer (which the gNB 104 can specify along with the SMTC) or a shared validity timer (which the gNB 104 can specify along with the NTN-specific measurement object or the measurement configuration).

Event 810 is generally similar to the event 710, except that the UE 102 performs 810 the measurement(s) when the timer associated with the SMTC is still running.

The UE 102 discards or releases 816 the SMTC specified in the NTN-specific measurement object, upon expiration of $T_{valid\_i}$. After discarding or releasing the SMTC, the UE 120 can transmit 824 UE assistance information to the gNB 104, similar to event 724 discussed previously. Upon receiving 824 the UE assistance information, the gNB 104 transmits 825 an RRC reconfiguration command with an updated measurement configuration and a new validity timer. The updated measurement configuration can include an updated NTN-specific measurement object including at least an updated SMTC. The gNB 104 can update the content SMTC similar to the scenario of FIG. 7.

Events 818 and 824 are similar to events 718 and 724, respectively. The gNB 104 then transmits 826 an RRC reconfiguration command to the UE 102, in which the gNB 104 can include an updated measurement object with an updated SMTC, and an updated validity timer for the updated SMTC. The UE 102 performs 840 the measurement (s) upon ascertaining that the updated timer associated with the updated SMTC is running. Events 850, 860, 870, and 880 are similar to events 750, 760, 770, and 770 discussed above.

In some implementations, the gNB 104 uses both the drifting parameter technique of FIG. 7 and the invalidity timer technique of FIG. 8. In particular, the gNB 104 includes both the drifting parameter and the value of the validity timer in the NTN-specific measurement object. Thus, each SMTC in the NTN-specific measurement object can be associated with an individual validity timer or a common validity timer, and also can include a drifting configuration instructing the UE 102 how to update the SMTC. While the validity timer is running, the UE 102 can perform measurement(s) according to the corresponding SMTC setting including the drifting configuration. After the validity timer expires, the UE 102 discards the corresponding SMTC setting including the drifting configuration.

Figure 9:
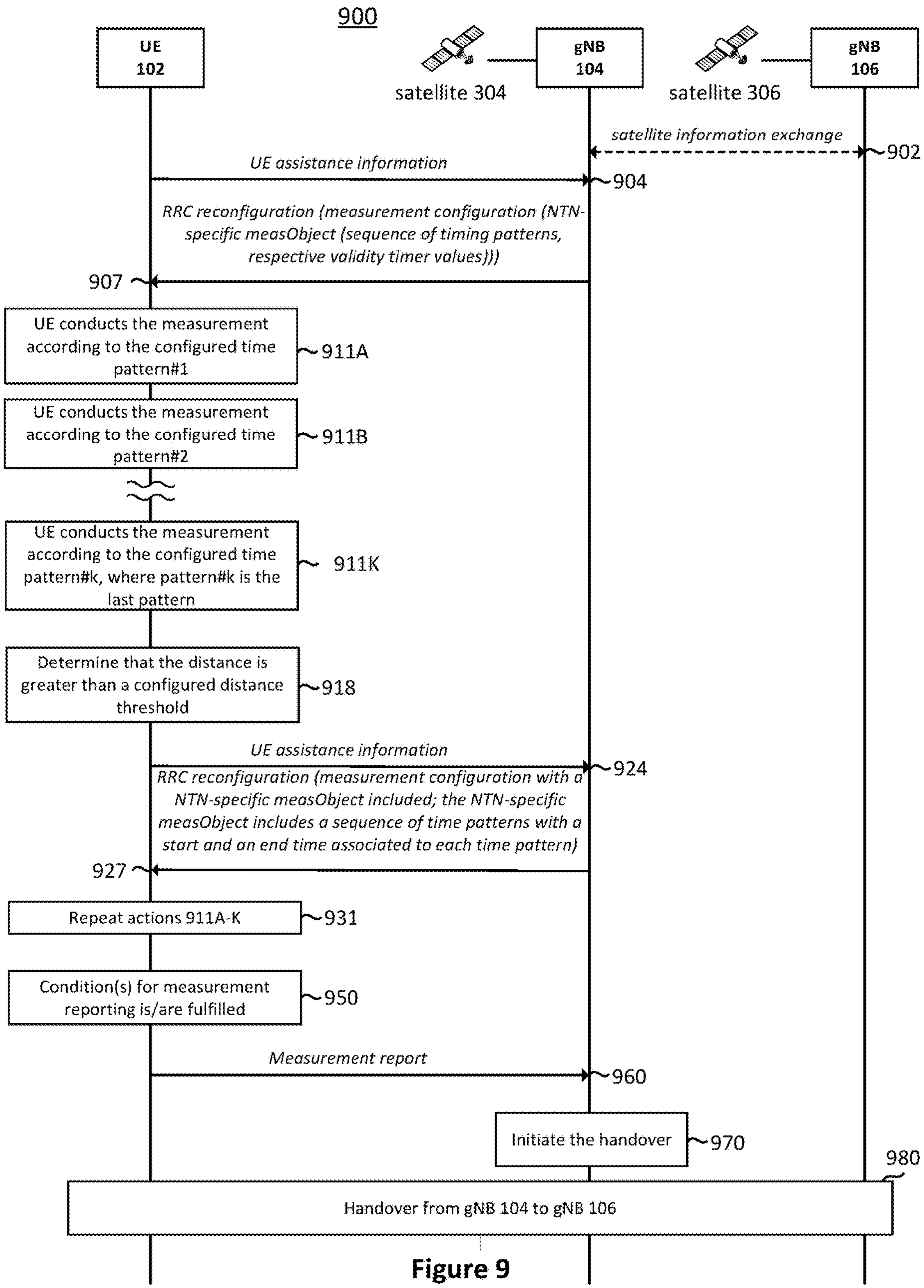
FIG. 9 illustrates an example scenario in which a serving satellite provides, to a UE operating a connected state, a sequence of time patterns and a sequence of values for respective validity timers.

In the scenario 900 illustrated in FIG. 9, a base station implements yet another technique. According to this approach, the base station provides a UE with multiple SMTCs pertaining to the same measurement target (e.g., the same satellite). Each SMTC is applicable for a certain period of time that does not overlap with the period of validity of any other SMTCs. The UE applies the SMTCs in sequence, traversing the set as a list.

Events 902, 904, 918, 924 950, 960, 970, and 980 are similar to events 802, 804, 818, 824, 850, 860, 870, and 880, respectively. In response to receiving 904 the UE assistance information, the gNB 104 transmits 907 an RRC reconfiguration command generally similar to the RRC reconfiguration command of events 707 and 807, but here the gNB 104 generates a measurement configuration that includes an NTN-specific measurement object with a set of SMTCs describing the SSB transmission patterns of the satellite 306 at different time periods. The gNB 104 determines the content of each SMTC using the information discussed above with reference to event 706. Each SMTC in the SMTC set is associated with a start time at which the UE 102 is to start applying the SMTC, and with an end time at which the UE 102 is to discard or release the SMTC. Each SMTC in the SMTC can include a periodicity, a time offset, and a duration setting. The gNB 104 can determine the time offset setting based on the time offset of the SSB configuration, the estimated distance between the serving satellite 304 and UE 102 during the period specified by the start and end time, and the estimated distance between the neighboring satellite 306 and the UE 102 during the period specified by the start and end time.

Upon receiving 907 the measurement configuration, the UE 102 performs 911A measurement(s) according to the first SMTC (i.e., time pattern 1) in the SMTC set. The UE 102 performs 911A this measurement within the period delimited by the start time and the end time associated with the first SMTC. The UE 102 then performs 911B measurement(s) according to the second SMTC (i.e., time pattern 2) in the SMTC set, again within the corresponding time limits. In this manner, the UE 102 traverses the list of the SMTCs until the UE 102 performs 911K the last measurement(s) within the period delimited by the start time and the end time associated with the last SMTC.

In response to receiving 924 UE assistance information, the gNB 104 can transmit 927 an RRC reconfiguration command with an updated measurement configuration and an updated SMTC set. The UE 102 repeat 931 the steps 911A-K according to the new SMTC set and performs a handover when the measurement report contains measurements that trigger a handover.

Figure 10:
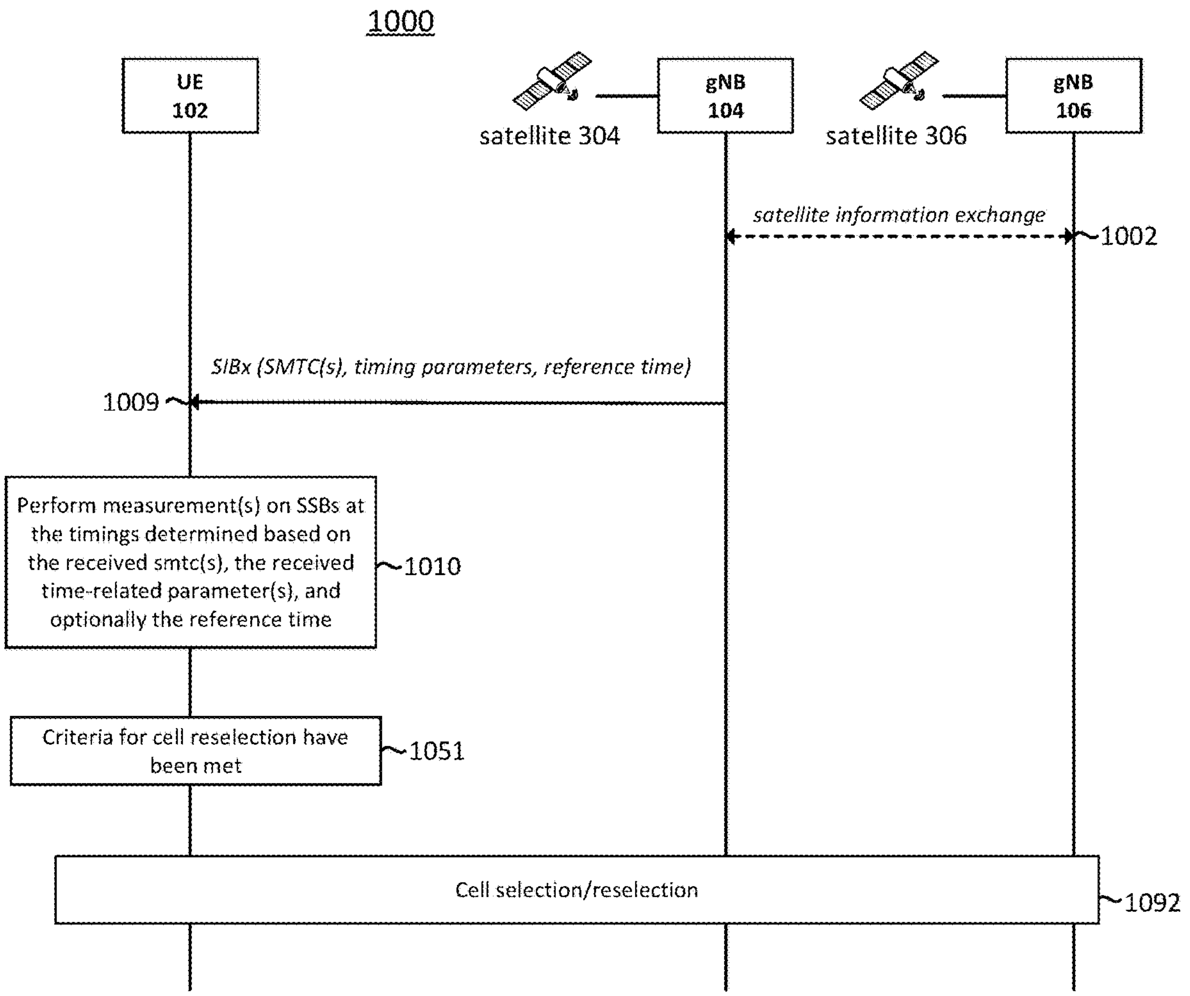
FIG. 10 illustrates an example scenario in which a serving satellite provides, to a UE operating in an idle or inactive state, a measurement configuration via a System Information Block (SIB)

Now referring to FIG. 10, the UE 102 in a scenario 1000 operates in an idle or inactive state. Thus, the UE 102 camps on a cell of the gNB 104. Event 1002 is similar to events 702, 802, 902.

The gNB 104 broadcasts 1009, in a system information, a measurement configuration including an SMTC and a time-related parameter associated with the SMTC. The time-related parameter(s) associated with the SMTC can be the drifting rate parameter(s) discussed with reference to FIG. 7, the validity timer(s) discussed with reference to FIG. 8, or the start and end times for respective SMTCs as discussed with reference to FIG. 9. The gNB 104 also can broadcast 1009 a common reference time (e.g., a UTC timing or a system frame number plus a subframe number) associated with the SMTC(s).

The UE 102 then performs 1010 measurement(s) at the time(s) corresponding to received SMTC(s), the received time-related parameter(s), and optionally the received reference time. If the reference time is not included in the system information broadcast, the UE 102 considers the reference time as the time when the UE 102 receives the SMTC(s) and the associated time-related parameter(s).

After the UE 102 completes 1010 the measurements, the UE 102 can determine 1051 that the cell reselection criteria for selecting a cell of the neighbor satellite 306 are satisfied (e.g., the cell served by the satellite 306 becomes the highest ranked cell according to the cell-ranking criterion). The UE 102 then initiates 1092 a procedure for reselecting to the cell of the neighbor satellite 306. The procedure can include (i) synchronizing with the gNB 106 and obtaining a PBCH from the gNB 106, (ii) acquiring SIB1 broadcast by the gNB 106, and in some cases (iii) performing a tracking area update or a RAN-based notification area update procedure, if the cell served by the satellite 306 belongs to a different tracking area or a different RAN-based notification area than the camped-upon satellite 304.

Next, several example methods that can be implemented in one or more devices of FIG. 1 are discussed with reference to FIGS. 11-13. Each of these methods can be implemented as a set of software instructions stored on a non-transitory computer-readable medium (e.g., a memory chip) and executable by one or more processors.

Figure 11:
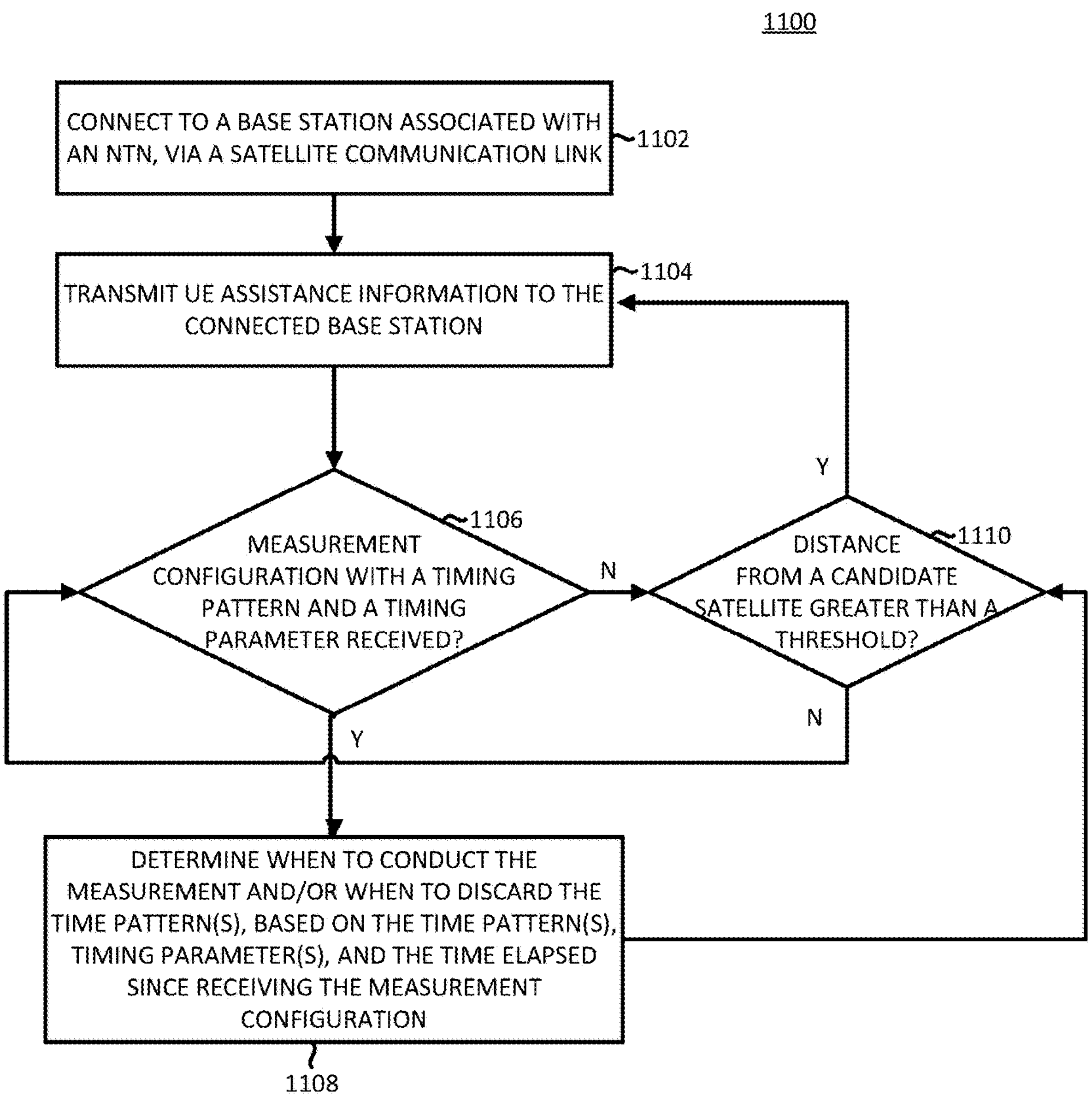
FIG. 11 is a flow diagram of an example method for managing measurement configuration in view of a timing parameter, which can be implemented in a UE of this disclosure.

Referring first to FIG. 11, a UE such as the UE 102 can implement a method 1100 to manage measurement configuration in view of a timing parameter, when operating in a connected state.

The method 1100 begins at block 1102, where the UE establishes an RRC connection with a base station (such as the base station 104) operating in an NTN. At block 1104, the UE operates in the connected state and transmits UE assistance information to the base station. The UE assistance information can include the UE geographic location information or other information that can assist the base station with determining the current geographic location of the UE. The UE assistance information can be related to the propagation delay between the UE and the serving satellite and/or to the propagation delays between the UE and neighboring satellites.

The UE then determines, at block 1106, whether it has received a measurement configuration including at least a time pattern and a time-related parameter associated with the time pattern from the connected base station. The time pattern can be an SMTC contained in a measurement object, and the time-related parameter can be the drifting parameter(s) discussed with reference to FIG. 7, the validity timer discussed with reference to FIG. 8, or the start and end times discussed with reference to FIG. 9. If the UE has received the measurement configuration containing at least a time pattern and the associated time-related parameter from the connected base station, the UE proceeds to block 1108. Otherwise, the flow proceeds to block 1110.

At block 1108, the UE determines when to conduct the measurement and/or when to discard the time pattern, based on the time pattern(s), the time-related parameter(s) configured in the measurement configuration, and the time elapsed since receiving the measurement configuration. When the measurement configuration contains a drifting rate parameter as the time-related parameter as described with reference to FIG. 7, the UE performs the measurement(s) by adjusting/shifting the time pattern (e.g., by multiplying the drifting rate parameter and the amount of time elapsed). When the measurement configuration contains a validity timer as the time-related parameter as described with reference to FIG. 8, the UE performs the measurement(s) according to the time pattern only if the corresponding validity timer is running. The validity timer is running only when the time elapsed since starting the timer is smaller than the value of the validity timer. When the measurement configuration contains a start time and an end time as the time-related parameter as described with reference to FIG. 9, the UE performs the measurement sequentially based on the patterns sorted by the start/end time tuples (i.e., the UE applies a time pattern if the time elapsed makes the current time of the UE fall within the time spanned by the start time and end time of that time pattern). The flow then proceeds to block 1110.

At block 1110, the UE determines whether it has moved a distance that is greater than a distance threshold as described with reference to events 718, 818, 918, which can be a fixed value or a value the base station explicitly provides. When the UE has moved a distance greater than the distance threshold, the flow proceeds to 1104; otherwise the flow proceeds to block 1106.

Figure 12:
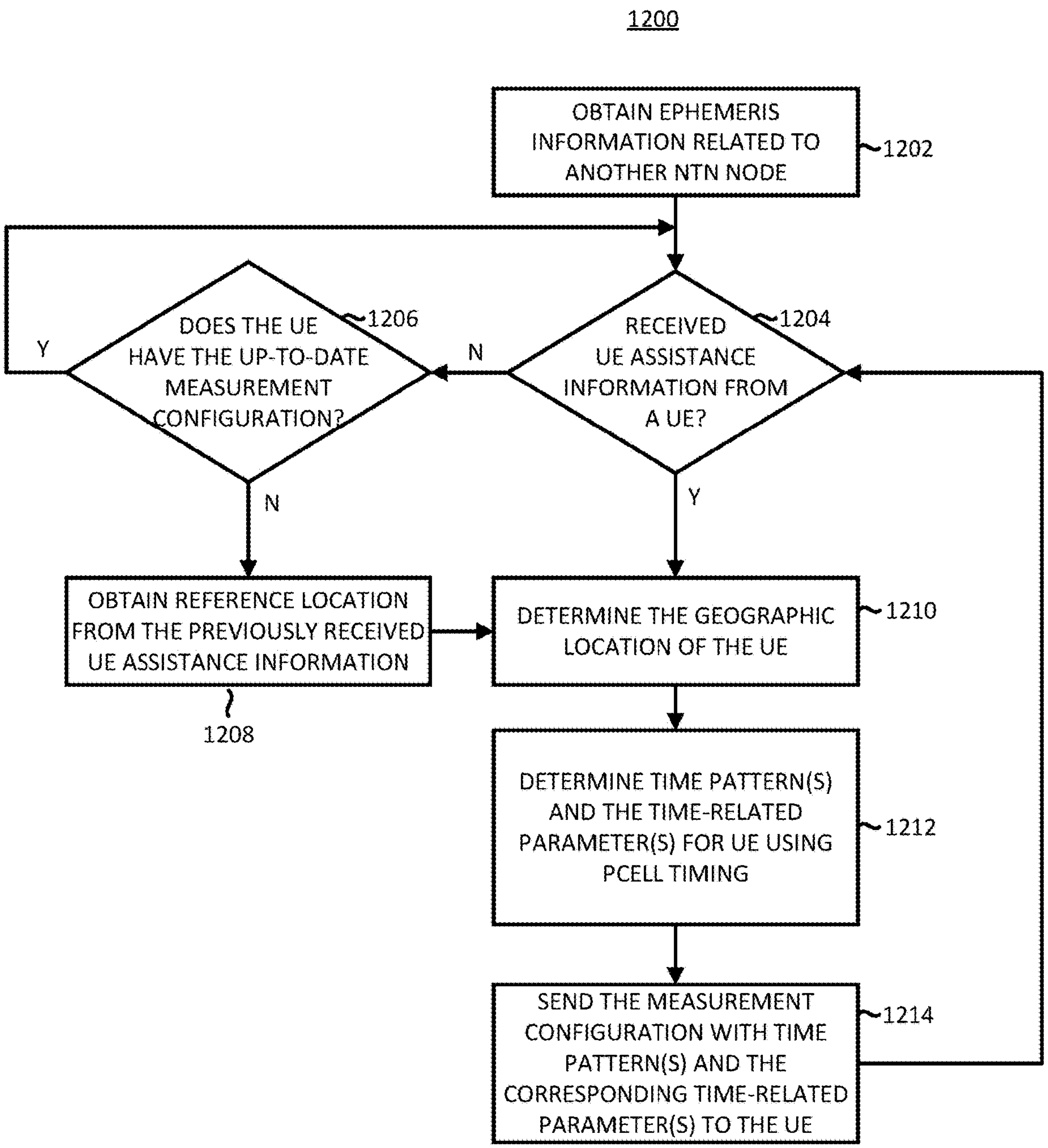
FIG. 12 is a flow diagram of an example method for providing a UE with a measurement configuration and a timing parameter, which can be implemented in an NTN node of this disclosure.

Now referring to FIG. 12, an NTN node such as the base station 104 or 106 can implement a method 1200 to provide a UE operating in a connected state with a measurement configuration and a timing parameter.

At block 1202, the base station obtains the ephemeris information from the core network via NGC, or from a neighboring base station via Xn. The ephemeris information indicates the location and the movement (e.g., the moving direction and moving speed) of one or more satellites of interest. The base station then determines, at block 1204, whether it has received any UE assistance information from the UE. If the base station has received UE assistance information, the base station is ready to determine the geographic location of the UE, and the flow can proceed to block 1210. Otherwise, the flow proceeds to block 1208 via block 1206, as the UE does not have the up-to-date measurement configuration. At block 1208, the base station determines the geographic location of the UE based on a reference location, and the flow then proceeds to block 1210.

At block 1210, the base station obtains the geographic location of the UE directly, without any further processing, when the received UE assistance information contains the UE geographic location information. However, when the received UE assistance information does not contain the UE geographic location information, the base station in some implementations calculates the geographic location of the UE using other information included in the UE assistance information, such as the propagation delay between the serving satellite and the UE, and the propagation delay between the measurement target and the UE. Alternatively, in some implementations the base station estimates the UE's geographic location based on a reference location or previously-received UE assistance information per block 1208. After determining the geographic location of the UE, the flow proceeds to block 1212.

At block 1212, the base station determines a time pattern and a time-related parameter associated with the time pattern, which the UE can use to perform the measurement on the SSB from the measurement target, based on the PCell timing. The timing parameter can correspond to one of the timing parameters discussed with reference to FIGS. 7-9.

At block 1214, the base station transmits the time pattern(s) and the time-related parameter(s) to the UE, so as to assist the UE with determining when to conduct the measurement, and/or when to discard the time pattern(s) based on the time elapsed since the UE received the time pattern(s) and the time-related parameter(s). The base station also can transmit a reference time (e.g., a UTC timing or a system frame number plus a subframe number) to the UE.

After transmitting the time pattern(s) and the time-related parameter(s) to the UE at block 1214, the flow returns to block 1204 to await further UE assistance information messages from the UE. If the base station receives further UE assistance information at block 1204, the flow proceeds again to block 1210, followed by block 1212 and block 1214. On the other hand, if the base station detects no further UE assistance information at block 1204, the flow proceeds to block 1206 to determine whether the measurement configuration (e.g., the time pattern and the time-related parameter) has been out-of-date due to the satellite movement. If the measurement configuration is not up-to-date, the base station obtains at block 1208 an estimate of the geographic location of the UE. The flow then proceeds to block 1210 for generating the new time pattern(s) and the new time-related parameter(s).

Figure 13:
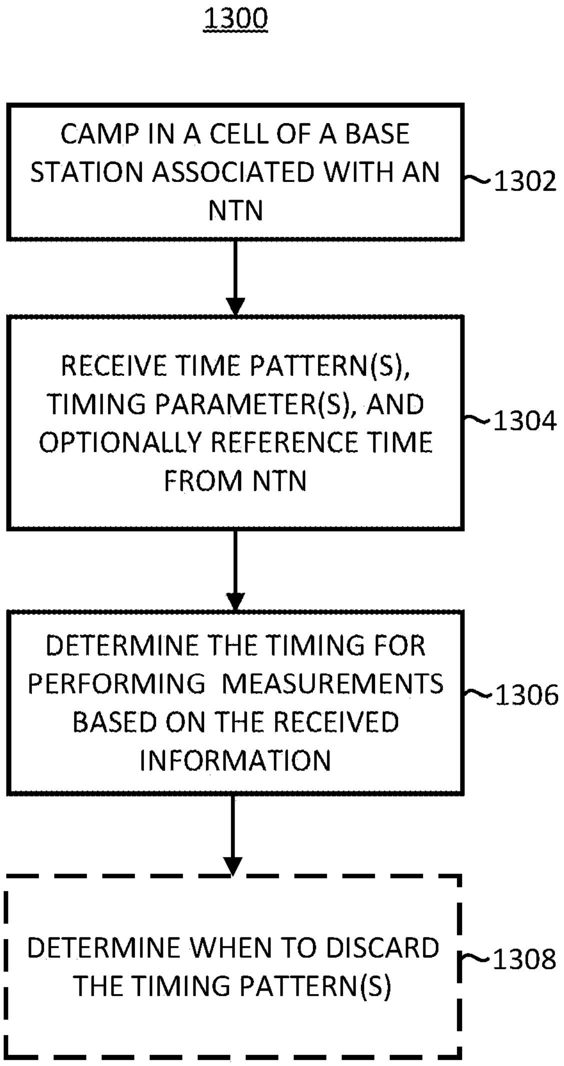
FIG. 13 is a flow diagram of an example method for managing measurement configuration and the timing for measuring synchronization signals, which can be implemented in a UE of this disclosure.

Finally, referring to FIG. 13, a UE operating in the inactive or idle state can implement a method 1300 to manage measurement configuration and the timing for measuring synchronization signals.

At block 1302, while the UE is in RRC_IDLE or RRC_INACTIVE mode, the UE camps on a cell of a base station operating in an NTN. At block 1304, the UE receives system information including a time pattern (e.g., an SMTC) and a time-related parameter associated with the time pattern in step 1304. The time-related parameter(s) can be the drifting rate parameter(s) discussed with reference to FIG. 7, the validity timer(s) discussed with reference to FIG. 8, or the start and end times discussed with reference to FIG. 9. The UE may also receive a common reference time (e.g., a UTC timing or a system frame number plus a subframe number) associated with the time pattern(s), at block 1304.

At block 1306, the UE determines when to conduct the measurement and/or when to discard the time pattern, based on the time pattern(s), the time-related parameter(s), and optionally the reference time indicated in the system information. When the time-related parameter is a drifting rate parameter, the UE conducts the measurement by adjusting/shifting the time pattern; when the time-related parameter is a validity timer, the UE performs the measurement(s) only if the corresponding validity timer is still running; and when the time-related parameters are start time and end times, the UE performs the measurement(s) sequentially, in the order of start end times of the patterns.

The list of examples below reflects a variety of the embodiments explicitly contemplated herein.

Example 1 is a method for synchronization signal measurement implemented in a UE. The method includes receiving, by the UE from a non-terrestrial network (NTN), a measurement configuration that indicates (i) a timing pattern according to which a signal source associated with the NTN transmits a synchronization signal and (ii) a timing parameter related to a change in timing alignment between the UE and the signal source; receiving, by the UE from the signal source, the synchronization signal in accordance with the timing pattern and the timing parameter; and processing, by the UE, the synchronization signal.

Example 2 is the method of example 1, wherein the timing parameter specifies a drifting function that indicates an amount by which the timing alignment shifts, per unit of time Example 3 is the method of example 2, wherein the drifting function is linear and corresponds to a fixed drifting rate; wherein receiving the synchronization signal includes (i) determining a time shift by multiplying the fixed drifting rate by a number of units of time that elapsed since the measurement configuration was received, and (ii) determining when the UE is to receive the synchronization signal by adjusting a synchronization signal reception time specified in the timing pattern using the time shift.

Example 4 is the method of example 2 wherein the drifting function is a nonlinear function; and wherein receiving the synchronization signal includes (i) determining a time shift by applying the nonlinear function to a number of units of time that elapsed since the measurement configuration was received; and determining when the UE is to receive the synchronization signal by adjusting a synchronization signal reception time specified in the timing pattern using the time shift.

Example 5 is the method of example 3 or 4, wherein the timing parameter further includes a reference time relative to which the UE is to calculate the time shift.

Example 6 is the method of example 2, further comprising: (i) determining a time shift using the timing parameter; and (ii) in response to determining that the timing parameter exceeds a predetermined threshold, requesting an updated measurement configuration from the NTN.

Example 7 is the method of any of the preceding examples, wherein the timing parameter indicates a validity time period during which the timing pattern remains valid.

Example 8 is the method of example 7, further comprising discarding the timing pattern after an amount of time equal to the validity time period has elapsed since receiving the measurement configuration.

Example 9 is the method of example 8, further comprising requesting, from the NTN, a new measurement configuration after the amount of time equal to the validity time has elapsed since receiving the measurement configuration.

Example 10 is the method of example 7, wherein the measurement configuration indicates a sequence of timing patterns and a plurality of respective validity time periods during which the corresponding timing pattern in the sequence remains valid.

Example 11 is the method of example 10, further comprising (i) receiving the synchronization signal according to an nth timing pattern in the sequence until an amount of time equal to the respective validity time period has expired; and (ii) after the amount of time has expired, receiving the synchronization signal according to an n+1th timing pattern in the sequence.

Example 12 is the method of any of examples 7-10, further comprising: in response to determining that the signal source is a distance greater than a predetermined distance threshold, requesting a new measurement configuration from the NTN.

Example 13 is the method of any of the preceding examples, wherein receiving the measurement configuration includes receiving a reconfiguration command associated with a protocol for controlling radio resources.

Example 14 is the method of any of the preceding examples, wherein receiving the measurement configuration includes receiving a reconfiguration command associated with a protocol for controlling radio resources, the measurement configuration included in the reconfiguration command.

Example 15 is the method of example 14, further comprising transmitting, by the processing hardware to the NTN, UE assistance information; wherein the reconfiguration command is in response to the UE assistance information.

Example 16 is the method of example 15, wherein transmitting the UE assistance information includes transmitting an indication of a current location of the UE.

Example 17 is the method of any of example 1-12, wherein receiving the measurement configuration includes: receiving a system information broadcast from the NTN, the system information including the measurement configuration.

Example 18 is the method of any of the preceding claims, wherein (i) the measurement configuration is received from a first satellite, and (ii) the signal source is a second satellite.

Example 19 is the method of example 18, wherein the first satellite is associated with a serving base station currently connected with the UE.

Example 20 is the method of any of the preceding examples, further comprising operating in an RRC_CONNECTED state when receiving the measurement configuration, receiving the synchronization signal.

Example 21 is the method of any of the preceding examples, wherein the timing pattern corresponds to a synchronization signal (SS) and physical broadcast channel (PBCH) block based measurement timing configuration (SMTC), the SMTC specifying subframes in which SSB is transmitted.

Example 22 is a UE comprising processing hardware and configured to implement a method of any of the preceding claims.

Example 23 is a method for configuring synchronization signal measurement at a UE, the method implemented in a serving NTN node and comprising: receiving, by the NTN node, information related to movement of a neighbor NTN node; and transmitting, by the NTN node, a measurement configuration generated in view of the information, the measurement configuration indicating (i) a timing pattern according to which the neighbor NTN node transmits a synchronization signal and (ii) a timing parameter related to a change in timing alignment between the UE and the neighbor NTN node.

Example 24 is the method of example 23, wherein the timing parameter specifies a drifting function that indicates an amount by which the timing alignment shifts, per unit of time.

Example 25 is the method of example 24, wherein the drifting function is linear and corresponds to a fixed drifting rate.

Example 26 is the method of example 24, wherein the drifting function is a nonlinear function.

Example 27 is the method of any of examples 23-26, wherein the timing parameter indicates a validity time period during which the timing pattern remains valid.

Example 28 is the method of any of examples 27, wherein the measurement configuration indicates a sequence of timing patterns and a plurality of respective validity time periods during which the corresponding timing pattern in the sequence remains valid.

Example 29 is the method of any of examples 23-28, wherein receiving the information includes receiving satellite ephemeris information.

Example 30 is the method of any of examples 23-29, wherein transmitting the measurement configuration includes transmitting a reconfiguration command associated with a protocol for controlling radio resources, the measurement configuration included in the reconfiguration command.

Example 31 is the method of example 30, wherein transmitting the measurement configuration is responsive to receiving, from the UE, a UE assistance information.

Example 32 is the method of any of examples 23-29, wherein transmitting the measurement configuration includes broadcasting a system information, the system information including the measurement configuration.

Example 33 is the method of any of examples 23-32, wherein the timing pattern corresponds to a synchronization signal (SS) and physical broadcast channel (PBCH) block based measurement timing configuration (SMTC), the SMTC specifying subframes in which SSB is transmitted.

Example 34 is an NTN node comprising processing hardware and configured to implement a method of any of examples 23-33.

The following description may be applied to the description above.

In some implementations, “message” is used and can be replaced by “information element (IE)”. In some implementations, “IE” is used and can be replaced by “field”. In some implementations, “configuration” can be replaced by “configurations” or the configuration parameters.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method for synchronization signal measurement implemented in a user equipment (UE), the method comprising:

receiving, by the UE from a non-terrestrial network (NTN), a measurement configuration that indicates (i) a timing pattern according to which a signal source associated with the NTN transmits a synchronization signal and (ii) a timing parameter related to a change in timing alignment between the UE and the signal source; and receiving, by the UE from the signal source, the synchronization signal at a synchronization signal reception time based on the timing pattern and a time shift depending on (a) the timing parameter, and (b) a time that elapsed since the receiving of the measurement configuration.

2. The method of claim 1, wherein:

the timing parameter specifies a drifting function that indicates an amount by which the timing alignment shifts, per unit of time.

3. The method of claim 2, wherein:

the drifting function is linear and corresponds to a fixed drifting rate; and the receiving the synchronization signal includes:

determining the time shift by multiplying the fixed drifting rate by a number of units of time that elapsed since the receiving of the measurement configuration; and determining the synchronization signal reception time when the UE is to receive the synchronization signal by adjusting a synchronization signal reception time specified in the timing pattern using the time shift.

4. The method of claim 2, wherein the drifting function is a nonlinear function; and the receiving the synchronization signal includes:

determining the time shift by applying the nonlinear function to a number of units of time that elapsed since the receiving of the measurement configuration; and determining the synchronization signal reception time when the UE is to receive the synchronization signal by adjusting a synchronization signal reception time specified in the timing pattern using the time shift.

5. The method of claim 1, wherein the timing parameter further includes a reference time relative to which the UE is to calculate the time shift.

6. The method of claim 1, wherein the receiving the measurement configuration includes:

receiving a reconfiguration command associated with a protocol for controlling radio resources.

7. The method of claim 1, further comprising:

in response to the receiving of the synchronization signal, transmitting a measurement report based on the synchronization signal.

8. The method of claim 1, wherein the receiving the measurement configuration includes:

receiving a system information broadcast from the NTN, the system information including the measurement configuration.

9. The method of claim 1, wherein the timing pattern corresponds to a synchronization signal (SS) and physical broadcast channel (PBCH) block based measurement timing configuration (SMTC), the SMTC specifying subframes in which SSB is transmitted.

10. A user equipment (UE) comprising processing hardware including a receiver, a transmitter and a processor configured to receive, from a non-terrestrial network (NTN), a measurement configuration that indicates (i) a timing pattern according to which a signal source associated with the NTN transmits a synchronization signal and (ii) a timing parameter related to a change in timing alignment between the UE and the signal source; and to receive, from the signal source, the synchronization signal at a synchronization signal reception time as specified in the timing pattern and adjusted using the timing parameter, and a number of units of time that elapsed since the receiving of the measurement configuration.

11. A method performed by a non-terrestrial network (NTN) node serving a user equipment (UE) for configuring a synchronization signal measurement at the UE, the method comprising:

receiving, by the NTN node, information related to movement of a neighbor NTN node; and transmitting, by the NTN node, a measurement configuration generated in view of the information, the measurement configuration indicating (i) a timing pattern according to which the neighbor NTN node transmits a synchronization signal and (ii) a timing parameter related to a change in timing alignment between the UE and the neighbor NTN node.

12. The method of claim 11, wherein:

the timing parameter specifies a drifting function that indicates an amount by which the timing alignment shifts, per unit of time.

13. The method of claim 11, wherein the receiving the information includes receiving satellite ephemeris information.

14. The method of claim 11, wherein the transmitting the measurement configuration includes:

transmitting a reconfiguration command associated with a protocol for controlling radio resources, the reconfiguration command including the measurement configuration.

15. The method of claim 14, wherein the transmitting the measurement configuration is responsive to receiving, from the UE, a UE assistance information.

16. The method of claim 11, wherein the timing pattern corresponds to a synchronization signal (SS) and physical broadcast channel (PBCH) block based measurement timing configuration (SMTC), the SMTC specifying subframes in which SSB is transmitted.

17. The method of claim 11, further comprising: receiving, from the UE, a measurement report based on the synchronization signal.

18. The method of claim 11, wherein the timing parameter includes a drift drifting function that indicates an amount by which the timing alignment shifts, per unit of time.

19. The method of claim 11, wherein the timing parameter further includes a reference time relative to which the UE is to calculate a time shift.

20. A non-terrestrial network (NTN) node comprising processing hardware including a receiver, a transmitter and a processor configured to receive information related to movement of a neighbor NTN node; and to transmit, to a user equipment (UE), a measurement configuration generated in view of the information, the measurement configuration indicating (i) a timing pattern according to which the neighbor NTN node transmits a synchronization signal and (ii) a timing parameter related to a change in timing alignment between the UE and the neighbor NTN node.

* * * * *